US012669763B2

(12) United States Patent
Shibata et al.

(10) Patent No.: US 12,669,763 B2
(45) Date of Patent: Jun. 30, 2026

(54) IMAGE FORMING APPARATUS INCLUDING CLEANING ROD

(71) Applicant: CANON KABUSHIKI KAISHA, Tokyo (JP)

(72) Inventors: Hayata Shibata, Chiba (JP); Nobuhisa Kojima, Chiba (JP); Ryo Abe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 18/610,624

(22) Filed: Mar. 20, 2024

(65) Prior Publication Data

US 2024/0345499 A1 Oct. 17, 2024

(30) Foreign Application Priority Data

Apr. 11, 2023 (JP) ................................ 2023-064103
May 12, 2023 (JP) ................................ 2023-079711

(51) Int. Cl.
*G03G 15/02* (2006.01)
*G03G 15/01* (2006.01)
(Continued)

(52) U.S. Cl.
CPC ....... *G03G 15/0258* (2013.01); *G03G 15/011* (2013.01); *G03G 15/04036* (2013.01); *G03G 15/04054* (2013.01); *G03G 21/1666* (2013.01); *G03G 2215/0407* (2013.01); *G03G 2215/0409* (2013.01); *G03G 2221/0005* (2013.01); *G03G 2221/0089* (2013.01)

(58) Field of Classification Search
CPC ............ G03G 15/011; G03G 15/0258; G03G 15/04036; G03G 15/04054; G03G 21/1666; G03G 2215/0407; G03G 2215/0409; G03G 2221/0089; G03G 2221/0005
See application file for complete search history.

(56) References Cited

U.S. PATENT DOCUMENTS 11,340,550 B2 5/2022 Okada et al.
2009/0162117 A1* 6/2009 Yamada ........... G03G 15/04072 399/343

(Continued)

FOREIGN PATENT DOCUMENTS

JP 2008173811 A 7/2008
JP 2021091191 A 6/2021

*Primary Examiner* — Joseph S Wong
(74) *Attorney, Agent, or Firm* — ROSSI, KIMMS & McDOWELL LLP

(57) ABSTRACT

An image forming apparatus includes: a rotating photosensitive member; an optical print head including a substrate on which a plurality of light emitting portions emitting light to expose the photosensitive member is provided, a lens condensing the light emitted by the plurality of light emitting portions on the photosensitive member, and a holder holding the substrate and the lens; a cleaning rod abutting on the lens and cleaning the lens; and a guiding member guiding the cleaning rod along a rotational axis direction of the photosensitive member and restricting movement of the cleaning rod in an optical axis direction orthogonal to both the rotational axis direction and a width direction of the substrate orthogonal to the rotational axis direction, the guiding member being separate from the holder.

15 Claims, 19 Drawing Sheets

(51) Int. Cl.
*G03G 15/04* (2006.01)
*G03G 21/16* (2006.01)

(56) References Cited

U.S. PATENT DOCUMENTS

| | | | | |
|---|---|---|---|---|
| 2014/0356017 | A1* | 12/2014 | Kobayashi ......... | G03G 21/1666 399/98 |
| 2022/0342338 | A1* | 10/2022 | Momoka .................... | B41J 2/45 |

* cited by examiner

IMAGE FORMING APPARATUS INCLUDING CLEANING ROD

BACKGROUND OF THE INVENTION

Field of the Invention

The present invention relates to an image forming apparatus such as a copying machine or a printer using a solid exposure head.

Description of the Related Art

Conventionally, as an image forming apparatus of an electrophotographic system, a system that forms an electrostatic latent image on a surface of a photosensitive member using an exposure head including an LED array and a lens array and causes a toner to adhere to the electrostatic latent image to develop a toner image has been widely used.

In the above-described image forming apparatus, a light emergent surface of the exposure head is provided at a position close to a surface of a photosensitive drum. A toner supplied from a development apparatus flows in the vicinity of the surface of the photosensitive drum, and thus, there is a case where the toner adheres to the light emergent surface of the exposure head so that an emitted light quantity decreases.

Therefore, a configuration including a cleaning member that cleans the light emergent surface of the exposure head has been disclosed. Japanese Patent Application Laid-Open No. 2008-173811 discloses a configuration in which a guide groove is formed in an exposure head along an axial direction of a photosensitive drum, and a hook portion provided in a cleaning member is engaged with the guide groove, so that the cleaning member abuts on a light emergent surface of the exposure head and can be guided along the guide groove.

Japanese Patent Application Laid-Open No. 2021-91191 discloses a configuration in which a flexible cleaning blade provided at a free end of a rod-like member is brought into contact with a light emergent surface to remove foreign matter adhering to the light emergent surface.

However, in the configuration disclosed in Japanese Patent Application Laid-Open No. 2008-173811, it is necessary to insert the cleaning member such that the hook portion of the cleaning member engaged with the guide groove of the exposure head does not fall off from the guide groove, and it is difficult to stably guide the cleaning member with respect to the exposure head. In addition, when an operator applies an unexpected force to the cleaning member during cleaning, the hook portion is likely to be disengaged from the guide groove, and there is a possibility that the cleaning member is not able to clean the light emergent surface of the exposure head.

In Japanese Patent Application Laid-Open No. 2021-91191, the cleaning blade comes into contact with the light emergent surface when a user operates the rod-like member. A distance between the cleaning blade and the light emergent surface in a light emitting direction changes depending on the user's operation method, and there is a possibility that the foreign matter adhering to the light emergent surface cannot be sufficiently removed depending on the distance.

SUMMARY OF THE INVENTION

A representative configuration of the present invention includes: a rotating photosensitive member; an optical print head including a plurality of light emitting portions provided along a rotational axis direction of the photosensitive member and configured to emit light to expose the photosensitive member, a substrate on which the plurality of light emitting portions is provided, a lens configured to condense the light emitted by the plurality of light emitting portions on the photosensitive member, and a holder configured to hold the substrate and the lens; a cleaning rod configured to abut on the lens and clean the lens; and a guiding member configured to guide the cleaning rod along the rotational axis direction and restrict movement of the cleaning rod in an optical axis direction orthogonal to both the rotational axis direction and a width direction of the substrate orthogonal to the rotational axis direction, the guiding member being separate from the holder.

Further, another configuration of the present invention includes: a photosensitive member; an optical print head including a plurality of light emitting portions configured to emit light to expose the photosensitive member, a substrate including a light emitting chip on which the plurality of light emitting portions is mounted, and a lens array configured to condense beams of the light emitted by the plurality of light emitting portions onto a surface of the photosensitive member; a housing configured to accommodate the photosensitive member and the optical print head inside; and a cleaning rod configured to be inserted into the housing, the cleaning rod including a rod-like member, a first cleaning portion provided on the rod-like member and configured to clean a surface of the lens array by rubbing the surface of the lens array, and a second cleaning portion provided on the rod-like member and configured to clean the surface of the lens array by rubbing the surface of the lens array. In this configuration, the first cleaning portion and the second cleaning portion are provided at different positions of the rod-like member in a longitudinal direction, the first cleaning portion protrudes from the rod-like member toward the lens array by a first protrusion amount in an optical axis direction of the light emitted from the plurality of light emitting portions when the cleaning rod is inserted into the housing, the second cleaning portion protrudes from the rod-like member toward the lens array by a second protrusion amount in the optical axis direction, and the first protrusion amount is longer than the second protrusion amount.

Further features of the present invention will become apparent from the following description of exemplary embodiments with reference to the attached drawings.

DESCRIPTION OF THE EMBODIMENTS

Hereinafter, preferred embodiments of the present invention will be described with examples in detail with reference to the drawings. However, dimensions, materials, shapes, and relative arrangements of constituent parts described in the following embodiments are merely examples, and the scope of the present invention is not intended to be limited thereto.

First Embodiment (Image Forming Apparatus)

Figure 1:
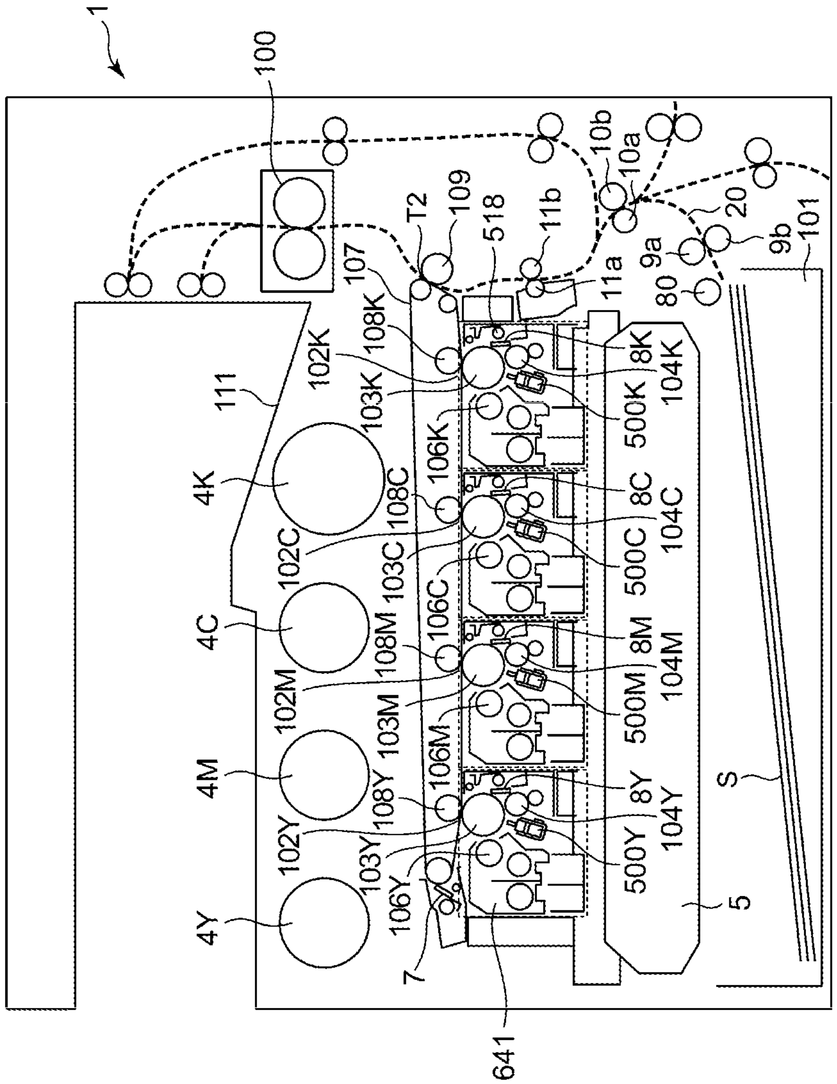
FIG. 1 is a cross-sectional view of an image forming apparatus.

First, a schematic configuration of an image forming apparatus 1 will be described. FIG. 1 is a schematic cross-sectional view of the image forming apparatus 1. Although the image forming apparatus 1 illustrated in FIG. 1 is a color printer (multi-function printer (MFP)) including a reading device, an embodiment may be another image forming apparatus such as a printer not including a reading device. In addition, an embodiment is not limited to a so-called tandem type color image forming apparatus including a plurality of photosensitive drums 103 as illustrated in FIG. 1, and may be a color image forming apparatus including one photosensitive drum 103 or an image forming apparatus that forms a monochrome image.

The image forming apparatus 1 illustrated in FIG. 1 includes four image forming portions 102Y, 102M, 102C, and 102K (hereinafter, also collectively referred to simply as "image forming portion 102") forming toner images of respective colors of yellow, magenta, cyan, and black.

The image forming portions 102Y, 102M, 102C, and 102K include photosensitive drums (photosensitive members) 103Y, 103M, 103C, and 103K (hereinafter, also collectively referred to simply as "photosensitive drum 103"), respectively. These photosensitive drums are arranged apart from each other.

The image forming portions 102Y, 102M, 102C, and 102K include charging devices 104Y, 104M, 104C, and 104K (hereinafter, also collectively referred to simply as "charging device 104") charging the photosensitive drums 103Y, 103M, 103C, and 103K, respectively.

In addition, the image forming portions 102Y, 102M, 102C, and 102K include exposure units 500Y, 500M, 500C, and 500K (hereinafter, also collectively referred to simply as "exposure unit 500") including light emitting diode (hereinafter described as LEDs) as exposure light sources that emit light to expose the photosensitive drums 103Y, 103M, 103C, and 103K.

Further, the image forming portions 102Y, 102M, 102C, and 102K include development devices 106Y, 106M, 106C, and 106K (hereinafter, also collectively referred to simply as "development device 106") each developing an electrostatic latent image on the photosensitive drum 103 with a toner and developing a toner image of each color on the photosensitive drum 103. Note that Y, M, C, and K attached to the reference numerals indicate toner colors.

The image forming apparatus 1 illustrated in FIG. 1 is an image forming apparatus that adopts a so-called "lower surface exposure system" in which the photosensitive drum 103 is exposed to light from below, that is, an exposure head is disposed below the photosensitive drum 103. Hereinafter, a description will be given on the premise of the image forming apparatus adopting the lower surface exposure system. Although not illustrated, an image forming apparatus adopting an "upper surface exposure system" in which a photosensitive drum is exposed to light from above may be used as an embodiment.

The image forming apparatus 1 includes an intermediate transfer belt 107 to which the toner image formed on the photosensitive drum 103 is transferred, and primary transfer rollers 108 (Y, M, C, and K) each sequentially transferring the toner image formed on the photosensitive drum 103 to the intermediate transfer belt. The intermediate transfer belt 107 is disposed above the image forming portion 102. Note that a direct transfer system in which direct transfer from the photosensitive drum 103 to a sheet may be used instead of an intermediate transfer system using the intermediate transfer belt 107.

In addition, the image forming apparatus 1 includes a secondary transfer roller 109 that transfers the toner image on the intermediate transfer belt 107 to a recording material S conveyed from a sheet feeding portion 101, and a fixing device 100 that fixes the secondarily transferred image to the recording material S.

Toners remain on surfaces of the photosensitive drums 103Y, 103M, 103C, and 103K after primary transfer. These residual toners are removed by drum cleaning devices (first cleaning devices) 8Y, 8M, 8C, and 8K (hereinafter, also collectively referred to simply as "drum cleaning device 8"), and are collected into a collected toner container 5.

In addition, a toner remains on a surface of the intermediate transfer belt 107 after the secondary transfer. This residual toner is removed by a belt cleaning device (second cleaning device) 7 and collected into the collected toner container 5.

(Image Formation Process)

Next, an image formation process of the image forming apparatus 1 will be briefly described. The charging device 104Y charges the surface of the photosensitive drum 103Y. The exposure unit 500Y exposes the surface of the photosensitive drum 103Y charged by the charging device 104Y to light. As a result, an electrostatic latent image is formed on the photosensitive drum 103Y. Next, the development device 106Y develops the electrostatic latent image formed on the photosensitive drum 103Y with a yellow toner. A toner image of yellow developed on the surface of the photosensitive drum 103Y is transferred onto the intermediate transfer belt 107 by the primary transfer roller 108Y.

Toner images of magenta, cyan, and black are also transferred to the intermediate transfer belt 107 in similar image formation processes.

The toner image of each color transferred onto the intermediate transfer belt 107 is conveyed to a secondary transfer portion T2 by the intermediate transfer belt 107. A transfer bias for transferring the toner image to the recording material S is applied to the secondary transfer roller 109 disposed in the secondary transfer portion T2. The toner image conveyed to the secondary transfer portion T2 is transferred to the recording material S conveyed from the sheet feeding portion (sheet feeding cassette) 101 by the transfer bias of the secondary transfer roller 109.

The recording material S is stored in a form of being stacked in the sheet feeding portion 101, and is fed to a conveyance path 20 according to an image formation timing. In a sheet feeding method, a leading end of the recording material S is first flipped up by friction of a sheet feeding roller 80, and only one sheet of the recording material S is conveyed to the conveyance path 20 by a pair of sheet separation conveying rollers 9*a* and 9*b* configured to prevent double feeding of the recording material S. Thereafter, the recording material S pulled out by a pair of conveying rollers 10*a* and 10*b* is conveyed to a pair of registration rollers 11*a* and 11*b* through the conveyance path 20, and is temporarily stopped. Note that skew feeding correction and timing correction are performed at the pair of registration rollers 11*a* and 11*b*, and then conveyance to the secondary transfer portion T2 is performed.

The recording material S to which the toner image has been transferred in the secondary transfer portion T2 is conveyed to the fixing device 100. The fixing device 100 fixes the toner image on the recording material S by heat and pressure. The recording material S subjected to the fixing processing by the fixing device 100 is discharged to a sheet discharging portion 111.

As illustrated in FIG. 1, the image forming apparatus 1 includes toner containers 4Y, 4M, 4C, and 4K (hereinafter, also collectively referred to simply as "toner container 4"). As image formation is performed, a toner amount in a developing unit 641 (described later) decreases. At that time, a toner is supplied from each of the toner containers 4Y, 4M, 4C, and 4K provided corresponding to the image forming portions 102Y, 102M, 102C, and 102K, respectively, to the developing unit 641 (described later) via a pipe (not illustrated). That is, in the developing unit 641 (described later) included in the image forming apparatus 1 described in the present embodiment, a new toner is replenished from the toner container 4, and a part of an excessive toner is conveyed to the collected toner container 5 as a residual toner.

(Drum Unit and Developing Unit)

A drum unit 518, which is an example of a replaceable replacement unit, is attached to the image forming apparatus 1 of the present embodiment. The drum unit 518 is a cartridge to be replaced by an operator such as a user or a maintenance person. The drum unit 518 (Y, M, C, or K) of the present embodiment includes the photosensitive drum 103 (Y, M, C, or K) rotatably supported with respect to a frame of the drum unit 518.

In addition, the developing unit 641 separate from the drum unit 518 is attached to the image forming apparatus 1 of the present embodiment. The developing unit 641 of the present embodiment is a cartridge in which the development device 106 and a toner accommodating portion illustrated in FIG. 1 are integrated. The development device 106 includes a developing sleeve that is a developer carrying member that carries a developer. The developing unit 641 is provided with a plurality of gears configured to rotate screws for stirring a toner and a carrier. When these gears deteriorate over time, the operator detaches the developing unit 641 from an apparatus body of the image forming apparatus 1 and replaces the developing unit 641. In addition, a certain amount of toner is removed as a residual toner from the developing unit 641, and is conveyed to the collected toner container 5. Note that a process cartridge in which the drum unit 518 and the developing unit 641 are integrated may be used as an embodiment of the drum unit 518 and the developing unit 641.

Figure 2:
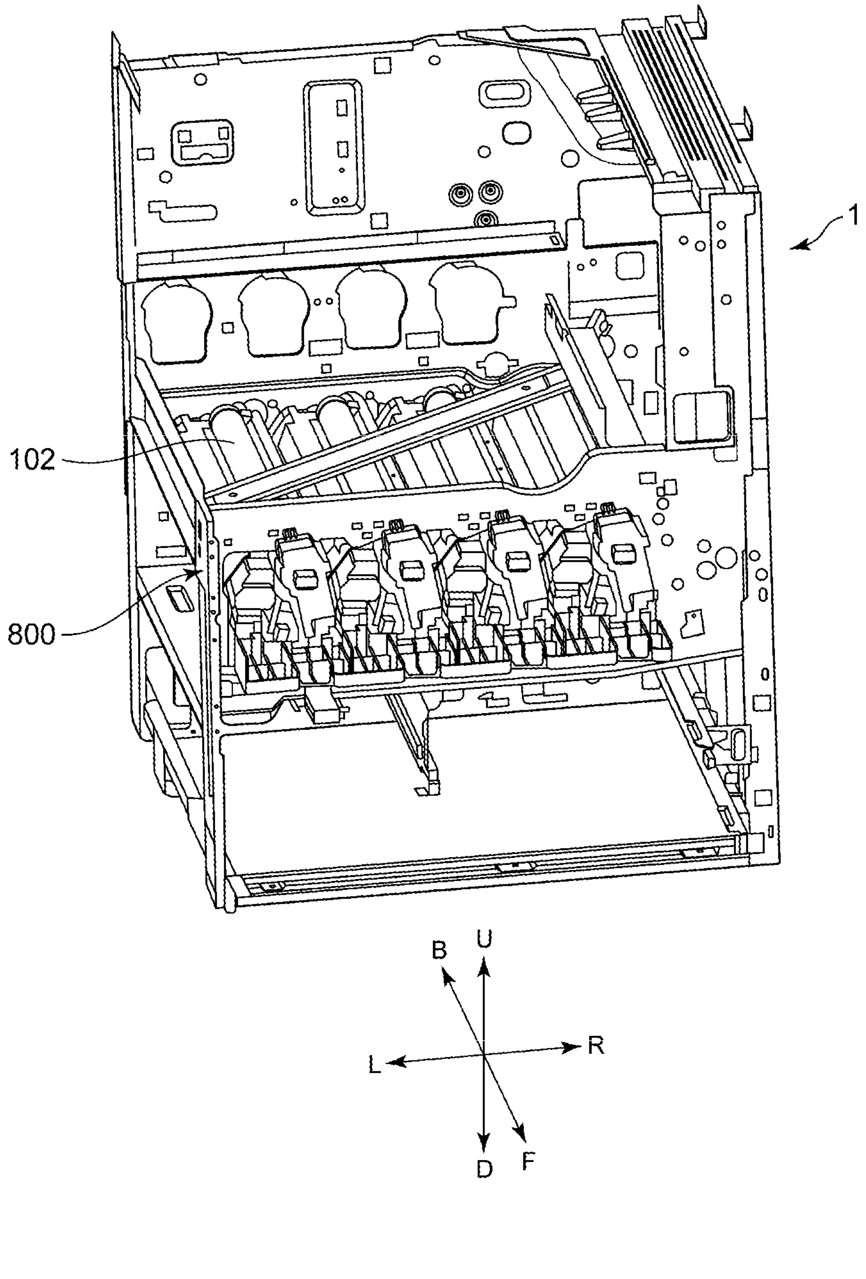
FIG. 2 is a view illustrating an image forming portion and a frame portion supporting the image forming portion.

FIG. 2 is a perspective view of the image forming apparatus 1 from which only peripheral parts of the image forming portion 102 and a frame portion supporting the peripheral parts are extracted.

Figure 3:
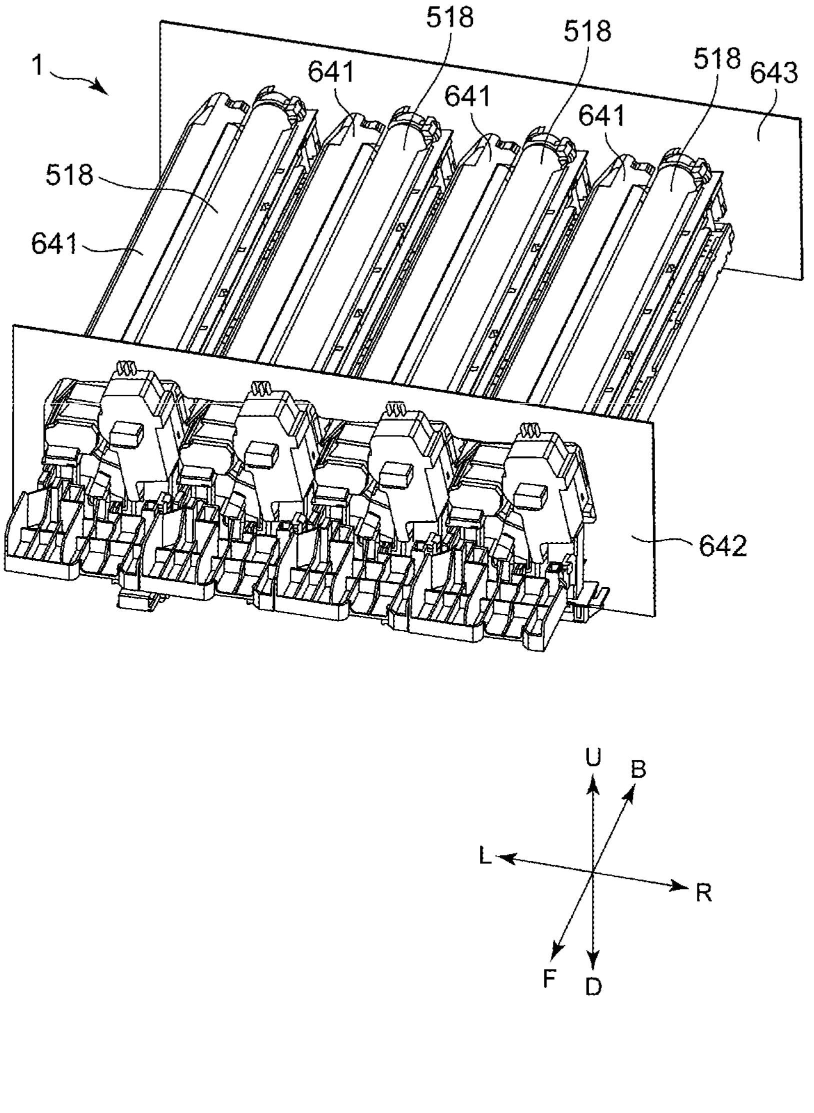
FIG. 3 is a view illustrating a drum unit and a developing unit.
Figure 4:
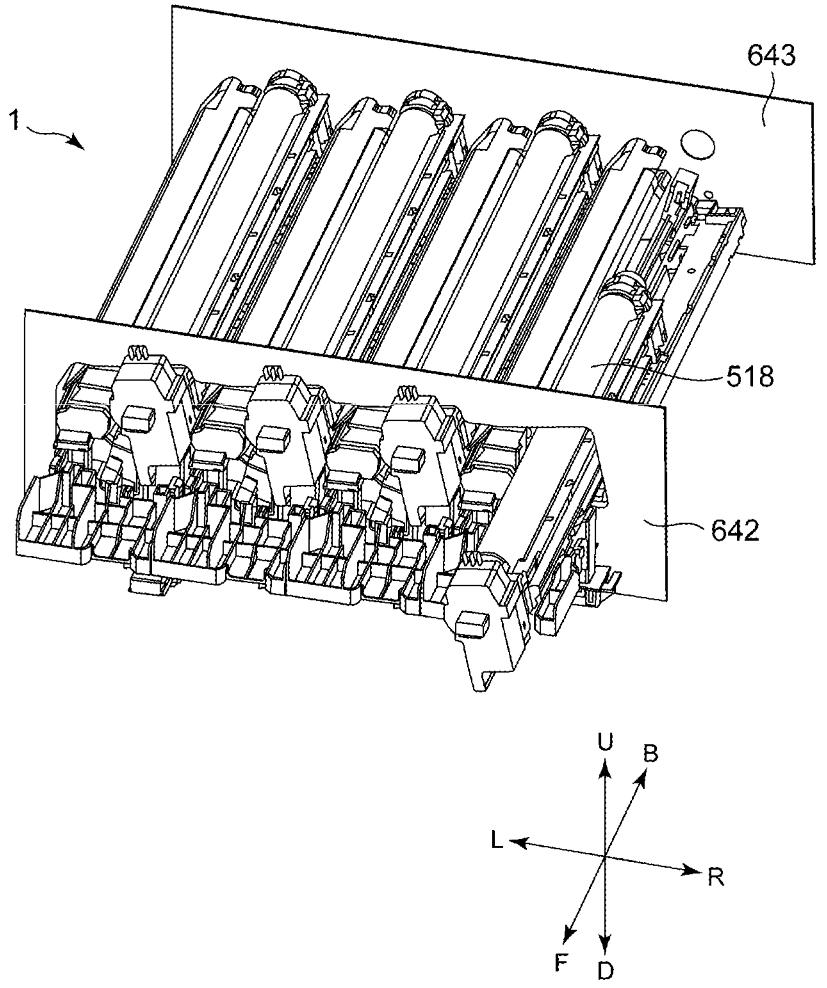
FIG. 4 is a view illustrating a state in which the drum unit is being inserted into the image forming apparatus.

FIG. 3 is an enlarged perspective view of the image forming portion 102 in FIG. 2. FIG. 3 illustrates the drum unit 518 and the developing unit 641 included in the image forming apparatus 1. FIG. 4 is a view illustrating a state in which the drum unit 518 is being inserted into the image forming apparatus 1 from the outer side of the apparatus body.

As illustrated in FIG. 3, the image forming apparatus 1 includes a front plate 642 made of sheet metal and a rear plate 643 similarly made of sheet metal. The front plate 642 is a side wall provided on the front side of the image forming apparatus 1. The rear plate 643 is a side wall provided on the rear side of the image forming apparatus 1. As illustrated in FIG. 3, the front plate 642 and the rear plate 643 are disposed to face each other, and sheet metal (not illustrated) as a beam is bridged between the both. Each of the front plate 642, the rear plate 643, and the beam (not illustrated) forms a part of a frame 800 of the image forming apparatus 1 (see FIG. 2).

An opening is formed in the front plate 642 such that the drum unit 518 and the developing unit 641 can be inserted and removed from the front side of the image forming apparatus 1. The drum unit 518 and the developing unit 641 are mounted at predetermined positions (mounting positions) of the body of the image forming apparatus 1 through the opening.

Next, a method for inserting and removing the drum unit 518 and the developing unit 641, which are parts that need to be periodically replaced, to and from the image forming apparatus 1 will be described in more detail.

Figure 5:
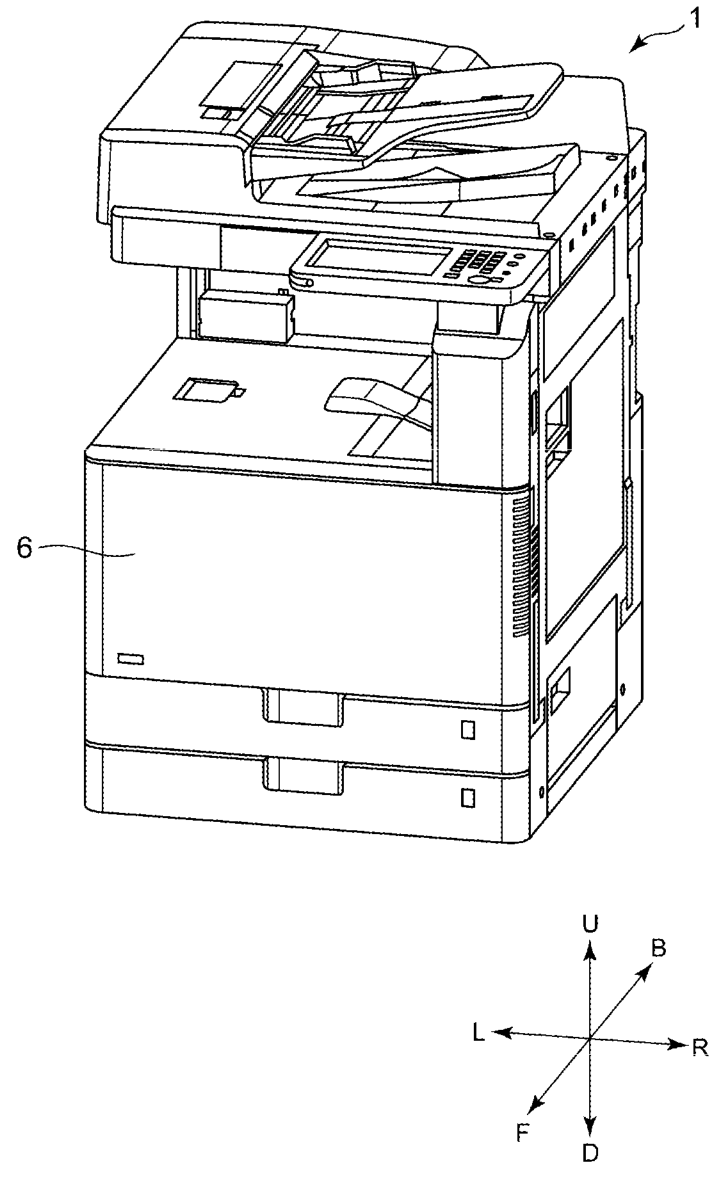
FIG. 5 is a perspective view illustrating the entire image forming apparatus.

FIG. 5 is a perspective view illustrating the entire image forming apparatus 1. A front cover 6 is provided on a side surface on the front side of the body of the image forming apparatus 1. The operator such as a user or a service person opens the front cover 6 at the time of maintenance and starts work.

Figure 6:
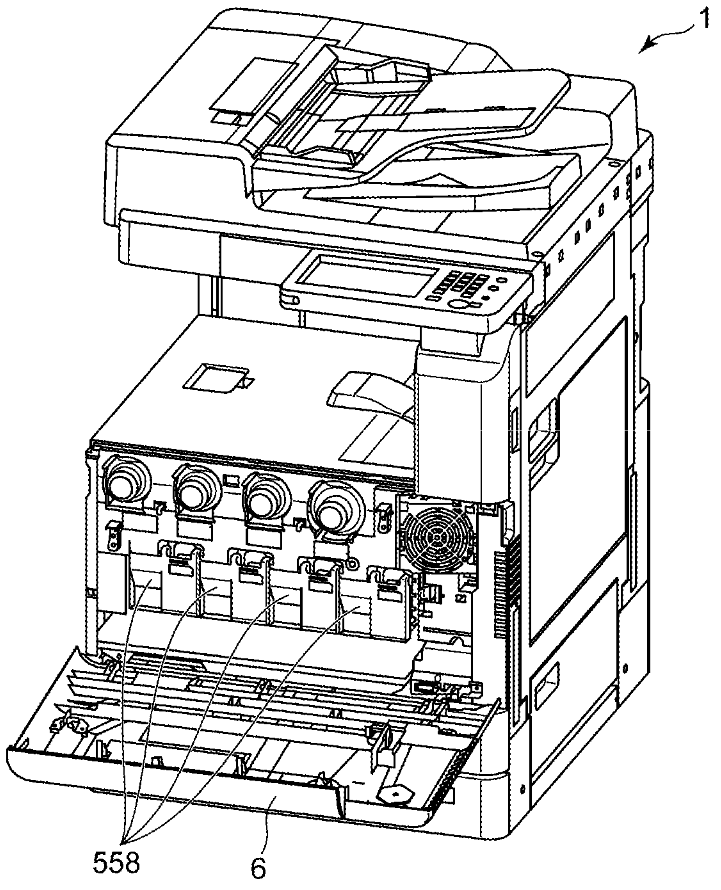
FIG. 6 is a perspective view illustrating the entire image forming apparatus.

FIG. 6 is a perspective view of the image forming apparatus 1 when the front cover 6 is opened. The image forming apparatus 1 includes cartridge covers 558 (Y, M, C, and K) covering the front side of both the drum unit 518 and the developing unit 641 mounted at the mounting positions. The cartridge cover 558 has one end fixed to the body of the image forming apparatus 1 by a hinge, and is rotatable with respect to the body of the image forming apparatus 1 via the hinge.

Figure 7:
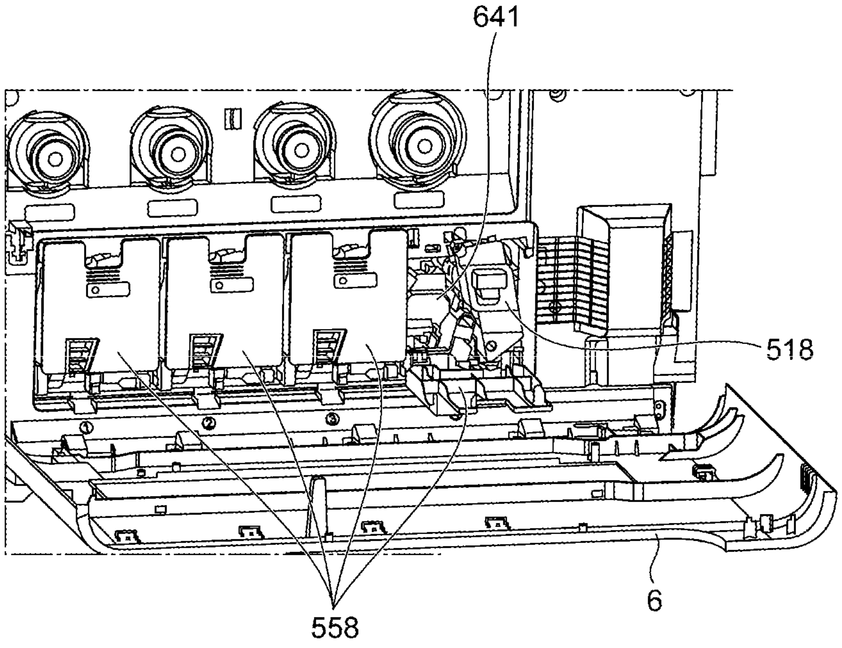
FIG. 7 is a perspective view of the image forming apparatus when a cartridge cover is opened.

FIG. 7 is a perspective view of the image forming apparatus 1 when the cartridge cover 558 is further opened from the state illustrated in FIG. 6. The operator who performs maintenance opens the cartridge cover 558 and takes out the drum unit 518 or the developing unit 641 in the body.

Figure 8:
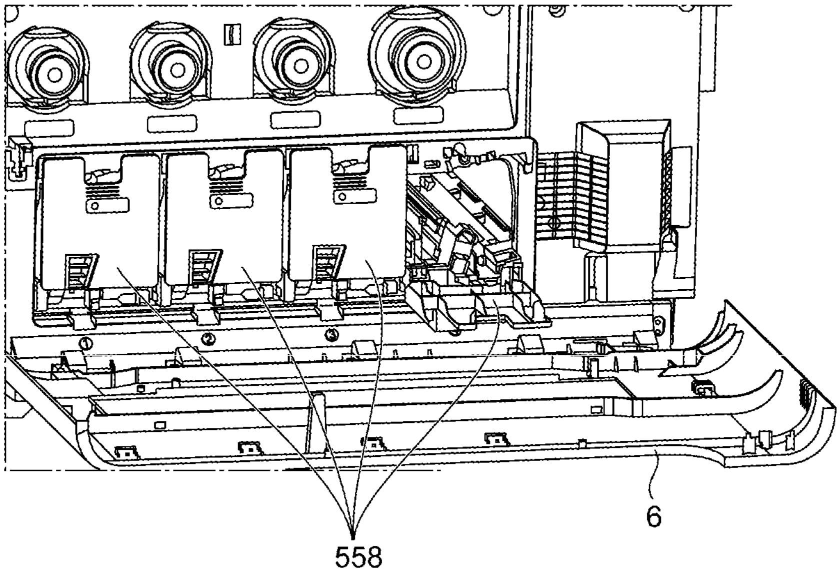
FIG. 8 is a perspective view illustrating that the drum unit or the developing unit is taken out.

FIG. 8 is a perspective view illustrating that the drum unit 518 and the developing unit 641 are taken out from the state illustrated in FIG. 7. Replacement work is completed by inserting the drum unit 518 or the developing unit 641 that is new and closing the cartridge cover 558 from this state.

In the following description, the front plate 642 side is defined as the front side, and the rear plate 643 side is defined as the rear side. In addition, when the photosensitive drum 103K on which an electrostatic latent image relating to a black toner image is formed is used as a reference, a side where the photosensitive drum 103Y on which an electrostatic latent image relating to a yellow toner image is formed is disposed is defined as the left side. When the photosensitive drum 103Y on which the electrostatic latent image relating to the yellow toner image is formed is used as the reference, a side where the photosensitive drum 103K on which the electrostatic latent image relating to the black toner image is formed is disposed is defined as the right side. Further, a direction that is perpendicular to the front-rear direction and the left-right direction defined here and directed upward in the vertical direction is defined as an upward direction, and a direction that is perpendicular to the front-rear direction and the left-right direction defined here and directed downward in the vertical direction is defined as a downward direction. The defined front direction F, rear direction B, right direction R, left direction L, upward direction U, and downward direction D are illustrated in FIGS. 2, 3, and 5.

In addition, one end side in a rotational axis direction of the photosensitive drum 103 described in the following description means the front side defined here, and the other end side means the rear side defined here. One end side and the other end side in the front-rear direction also correspond to the front side and the rear side defined here. One end side in the left-right direction means the right side defined here, and the other end side means the left side defined here.

Here, in the present embodiment, a toner (developer) accommodated in a toner container (developing container) is a two-component developer in which a negatively charged nonmagnetic toner and a magnetic carrier are mixed. The nonmagnetic toner contains a colorant, a wax component, and the like in a resin such as polyester or styrene, and is pulverized or polymerized to form powder. In the present embodiment, the nonmagnetic toner having an average particle diameter of 5 μm is used. The magnetic carrier is obtained by applying a resin coating to a surface layer of a core including ferrite particles or resin particles obtained by kneading magnetic powder.

(Basic Configuration of Optical Print Head)

Next, an optical print head (exposure head) 105 included in the exposure unit 500 will be described. Here, an example of an exposure system adopted in an image forming apparatus of an electrophotographic system is a laser beam scanning exposure system in which scanning with an irradiation beam of a semiconductor laser is performed using a rotating polygon mirror to expose a photosensitive drum through an f-θ lens. The "optical print head 105" described in the present embodiment is used for an LED exposure system in which the photosensitive drum 103 is exposed to light using light emitting elements such as LEDs arranged along the rotational axis direction of the photosensitive drum 103, and is not used for the laser beam scanning exposure system described above.

Figure 9:
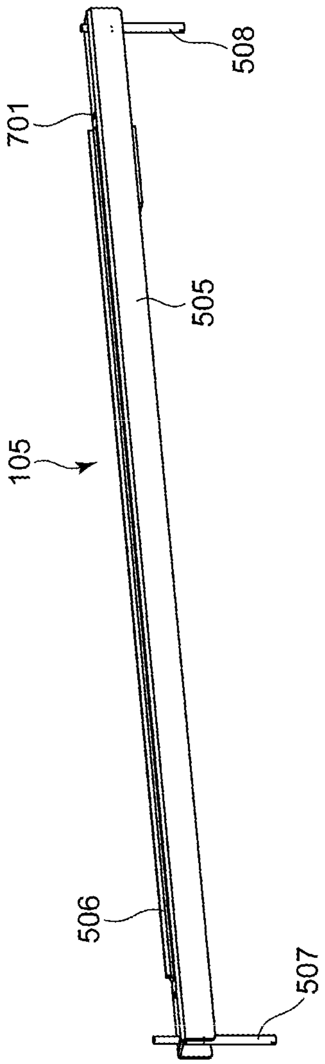
FIG. 9 is a schematic perspective view of an optical print head included in the image forming apparatus.

The optical print head 105 described in the present embodiment is provided on the lower side in the vertical direction with respect to the rotational axis of the photosensitive drum 103, and exposes the photosensitive drum 103 from below by a light beam emitted from an LED 503 of the optical print head 105. FIG. 9 is a schematic perspective view of the optical print head 105 included in the image forming apparatus 1 of the present embodiment.

As illustrated in FIG. 9, the optical print head (exposure head) 105 has a long shape (longitudinal shape) extending in the rotational axis direction of the photosensitive drum 103. The optical print head 105 includes a substrate 502, a light emitting element mounted on the substrate 502, a lens array 506, and a holding member 505 that holds the substrate 502 and the lens array 506. Here, the optical print head 105 includes the LED 503 (light emitting diode) as the light emitting element that emits light (see FIG. 10C). The substrate 502 is installed inside the holding member 505. The holding member 505 is provided with a lens attachment portion 701 to which the lens array 506 is attached.

Figure 10A:
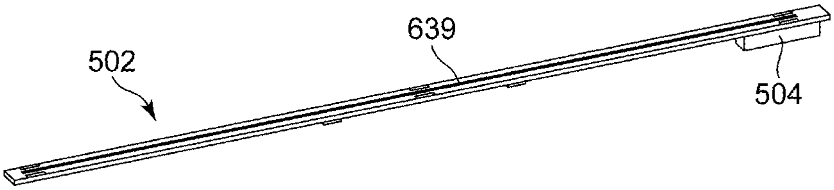
FIGS. 10A to 10C are views illustrating a schematic configuration of a substrate.
Figure 10B:
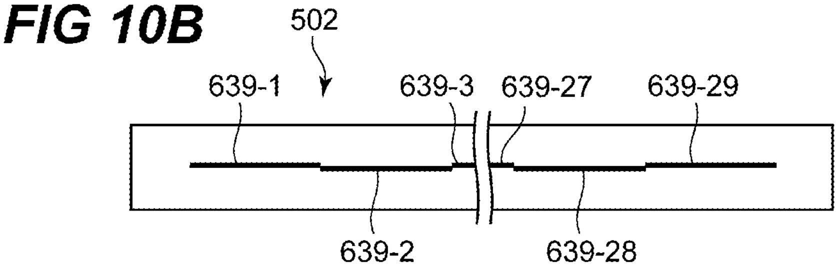
Figure 10C:
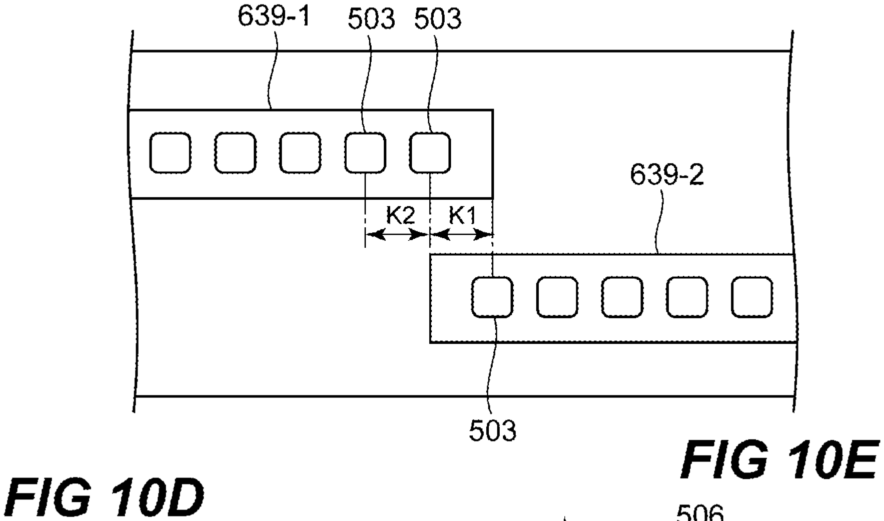

Next, the substrate 502 held by the holding member 505 will be described. FIG. 10A is a schematic perspective view of the substrate 502. FIG. 10B illustrates an arrangement on the substrate 502 of a plurality of the LEDs 503 provided on the substrate 502. FIG. 10C is an enlarged view of FIG. 10B.

An LED chip 639 is mounted on the substrate 502. As illustrated in FIG. 10A, an LED chip 639 is provided on one surface of the substrate 502, and a long FFC connector 504 is provided on the other surface (surface opposite to a side where the light emitting elements are arrayed). The FFC connector 504 is attached to a lower surface of the substrate 502 such that its longitudinal direction is along a longitudinal direction of the substrate 502. The substrate 502 is provided with wiring configured to supply a signal to each LED chip 639. One end of a flexible flat cable (not illustrated, hereinafter referred to as FFC), which is an example of a cable, is connected to the FFC connector 504.

The body of the image forming apparatus 1 is provided with a substrate (not illustrated) including a controller and a connector. The other end of the FFC is connected to the connector. That is, the FFC electrically connects the substrate of the body of the image forming apparatus 1 and the substrate 502 of the optical print head 105. A control signal (drive signal) is input to the substrate 502 from the controller of the body of the image forming apparatus 1 via the FFC and the FFC connector 504. The LED chip 639 is driven by the control signal input to the substrate 502.

The LED chip 639 mounted on the substrate 502 will be described in more detail. As illustrated in FIGS. 10B and 10C, a plurality of LED chips 639-1 to 639-29 (29) in which a plurality of the LEDs 503 (an example of a light emitting element) is disposed is arranged on one surface of the substrate 502. Each of the LED chips 639-1 to 639-29 includes 516 LEDs 503 arranged in a row in its longitudinal direction. A center-to-center distance k2 between the LEDs 503 adjacent to each other in the longitudinal direction of the LED chip 639 corresponds to the resolution of the image forming apparatus 1. Since the resolution of the image forming apparatus 1 of the present embodiment is 1200 dpi, the LEDs 503 are arranged in a row such that the center-to-center distance k2 between of the adjacent LEDs 503 is 21.16 μm in the longitudinal direction of the LED chips 639-1 to 639-29. Therefore, an exposure range of the optical print head 105 of the present embodiment is about 314 mm. A photosensitive layer of the photosensitive drum 103 is formed to have a width of 314 mm or more. Since a length of a long side of an A4-size recording sheet and a length of a short side of an A3-size recording sheet are 297 mm, the optical print head 105 of the present embodiment has an exposure range that enables image formation on the A4-size recording sheet and the A3-size recording sheet.

The LED chips 639-1 to 639-29 are alternately disposed in two rows along the rotational axis direction of the photosensitive drum 103. That is, as illustrated in FIG. 10B, the odd-numbered LED chips 639-1, 639-3, . . . , and 639-29 counted from the left side are mounted in a row in the longitudinal direction of the substrate 502. Further, the even-numbered LED chips 639-2, 639-4, . . . , and 639-28 counted from the left side are mounted in a row in the longitudinal direction of the substrate 502. Since the LED chips 639 are disposed in this manner, a center-to-center distance k1 between the LEDs 503 disposed at one end of one LED chip 639 and another end of the other LED chip 639, respectively, of the different LED chips 639 adjacent to each other in the longitudinal direction of the LED chip 639 can be made equal to the center-to-center distance k2 of the adjacent LEDs 503 on one LED chip 639 as illustrated in FIG. 10C.

Note that the light emitting element (exposure light source) is a semiconductor LED which is a light emitting diode in the present embodiment, but may be, for example, an organic light emitting diode (OLED). This OLED is also called organic electro-luminescence (EL), and is a current-driven light emitting element. The OLEDs are disposed on a line along a main scanning direction (axial direction of the photosensitive drum 103) on a thin film transistor (TFT) substrate, for example, and are electrically connected in parallel by power supply wiring similarly provided along the main scanning direction.

Figure 10D:
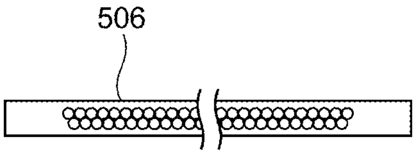
FIGS. 10D and 10E are views illustrating a schematic configuration of a lens array.
Figure 10E:
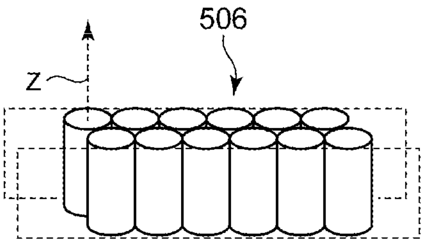

Next, the lens array 506 which is a lens assembly will be described. FIG. 10D is a schematic view of the lens array 506 as seen from the photosensitive drum 103 side. FIG. 10E is a schematic perspective view of the lens array 506. As illustrated in FIG. 10D, the lens array 506 condenses light emitted from the light emitting element on the photosensitive drum 103. The lens array 506 is a lens assembly including a plurality of lenses. The plurality of lenses is arrayed in two rows along the arrangement direction of the plurality of LEDs 503. The respective lenses are alternately disposed such that two lenses adjacent to each other in the arrangement direction of lenses in one row are in contact with one of lenses in the other row. Each of the lenses is a rod lens made of glass and having a cylindrical shape. Each of the lenses has a light incident surface 506*b* on which light emitted from the LED 503 is incident and a light emergent surface 506*a* from which the light incident from the light incident surface is emitted (see FIG. 14B). Note that a material of the lens is not limited to glass, and may be plastic. A shape of the lens is not limited to the cylindrical shape, and may be, for example, a polygonal prism such as a hexagonal prism.

A dotted line Z illustrated in FIG. 10E indicates an optical axis of the lens. The optical print head 105 is movable in a direction substantially along the optical axis of the lens (hereinafter, also referred to as an optical axis direction) indicated by the dotted line Z by a moving mechanism (not illustrated). The optical axis of the lens referred to here means a line connecting the center of a light emergent surface of a lens and a focal point of the lens. The lens array 506 is a lens assembly including a plurality of lenses, and the above-described "optical axis" is an optical axis of any lens among the plurality of lenses. Here, strictly speaking, the plurality of lenses included in the lens array 506 may be slightly inclined to each other. This is due to a tolerance in assembly. However, deviation from the tolerance referred to here is not considered when the optical axis direction is defined. Thus, it is considered that optical axes of the plurality of lenses are set in the same direction. The lens array 506 functions to condense light emitted from the LED 503 on the surface of the photosensitive drum 103. That is, radiation light emitted from the LED 503 is incident on the lens provided in the lens array 506. The lens has a function of condensing the incident radiation light on the surface of the photosensitive drum 103.

An attachment position of the lens array 506 with respect to the lens attachment portion 701 (see FIG. 9) is adjusted at the time of assembling the optical print head 105 such that a distance between a light emitting surface of the LED 503 and the light incident surface of the lens is substantially equal to a distance between the light emergent surface of the lens and the surface of the photosensitive drum 103.

The optical print head 105 is provided inside the image forming apparatus to be movable between an exposure position of exposing the photosensitive drum 103 and a retracted position farther away from the photosensitive drum 103 than the exposure position. The optical print head 105 exposes the photosensitive drum 103 at the exposure position. The optical print head 105 is moved between the exposure position and the retracted position by the moving mechanism (not illustrated).

The holding member 505 of the optical print head 105 is provided with a positioning pin 507 and a positioning pin 508. The positioning pin 507 is provided on the holding member 505 on one side (at an end on the front side of the lens array 506) in the rotational axis direction of the photosensitive drum 103. The positioning pin 508 is provided on the holding member 505 on the other side (at an end on the rear side of the lens array 506) in the rotational axis direction of the photosensitive drum 103.

The positioning pins 507 and 508 project from both sides of the holding member 505 in the optical axis direction of the lens array 506. As the positioning pin 507 and the positioning pin 508 butt against the drum unit 518, a gap is formed between the lens array 506 and the photosensitive drum 103. The position (exposure position) of the optical print head 105 with respect to the photosensitive drum 103 is set in this manner.

(Configuration of Cleaning Rod)

In the image forming apparatus 1, the optical print head (exposure head) 105 is provided between the charging device 104 and the development device 106. When foreign matter such as a toner adheres to the light emergent surface of the lens array 506 provided in the optical print head 105, there is a possibility that light emitted from the light emitting element is partially shielded, which causes degradation in image quality of an output image. Therefore, it is desirable that the light emergent surface of the optical print head 105 be periodically cleaned.

The image forming apparatus 1 includes a cleaning rod 801 as a cleaning member that cleans the lens array 506 of the optical print head 105. A configuration of the cleaning rod 801 will be described with reference to FIGS. 11A to 11C.

Figure 11A:
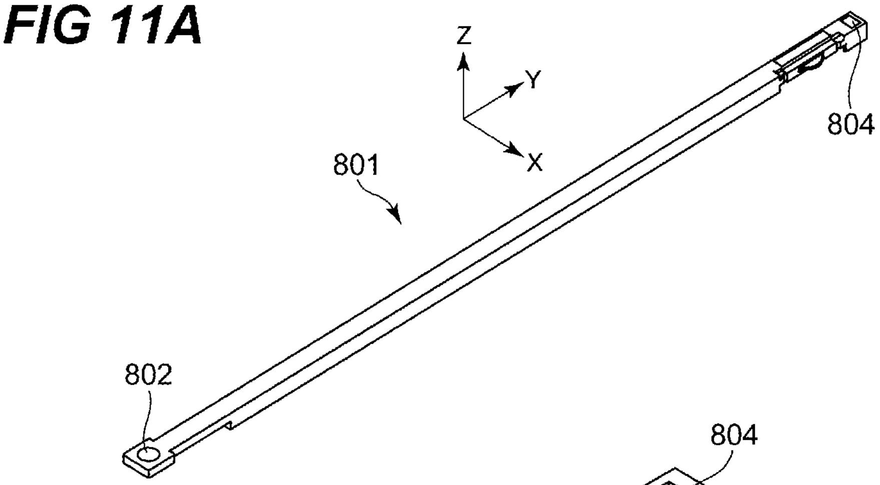
FIGS. 11A to 11C are views illustrating a configuration of a cleaning rod according to a first embodiment.
Figure 11B:
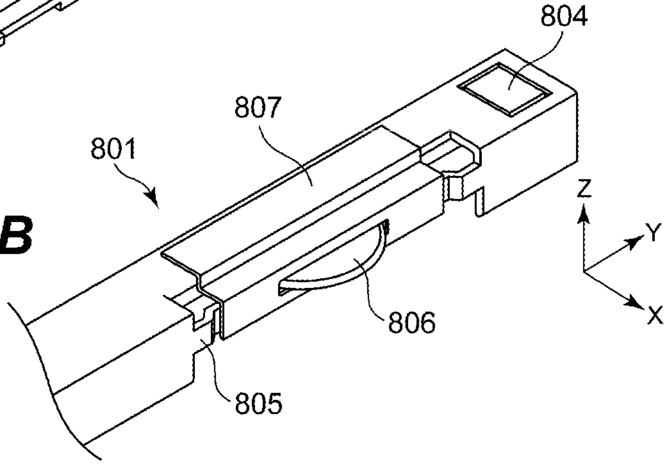
Figure 11C:
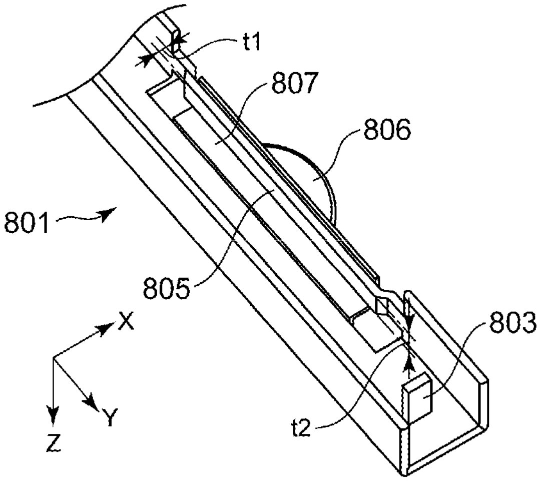

FIG. 11A is a schematic perspective view of the cleaning rod 801 that cleans a surface (light emergent surface) of the lens array 506 of the optical print head 105. FIG. 11B is a view illustrating one end side (distal end side) of the cleaning rod 801 in a longitudinal direction. FIG. 11C is a view of the distal end side of the cleaning rod 801 as seen from below. Here, a longitudinal direction of the optical print head 105 is a direction along the rotational axis direction of the photosensitive drum 103, and is a direction parallel to the rotational axis direction. The front side in the longitudinal direction of the optical print head 105 means the front side in the front-rear direction, and the back side in the longitudinal direction means the rear side in the front-rear direction. In addition, a width direction orthogonal to the longitudinal direction of the optical print head 105 is defined as a first direction. In addition, an optical axis direction orthogonal to both the longitudinal direction of the optical print head 105 and the width direction (first direction) orthogonal to the longitudinal direction is defined as a second direction. FIGS. 11A to 14B illustrate defined longitudinal direction Y, width direction (first direction) X, and optical axis direction (second direction) Z.

The cleaning rod 801 cleans the lens array 506 of the optical print head 105. The cleaning rod 801 has an elongated rod shape as a whole, and has a shape extending in the longitudinal direction along the rotational axis direction of the photosensitive drum 103. The cleaning rod 801 includes a cleaning portion 803, a grip portion 802, a protruding portion 806, an elastic portion 805, and a guide member 807.

The grip portion 802 is provided at the other end (a rear end) of the cleaning rod 801 in the longitudinal direction, and is a portion gripped by the operator during cleaning.

The cleaning portion 803 is provided at one end (distal end) of the cleaning rod 801 in the longitudinal direction, and abuts on the lens array 506 and cleans the lens array 506. Although details will be described later, the cleaning portion 803 is provided on the lower side of the cleaning rod 801. The cleaning rod 801 moves the cleaning portion 803 in the longitudinal direction to clean the lens array 506. A pressing member 804 configured to fix the cleaning portion 803 is provided on the distal end side of the cleaning rod 801 in the longitudinal direction.

The cleaning rod 801 is provided with the elastic portion 805 on one side in the width direction. In the elastic portion 805, a rigidity in the width direction orthogonal to the longitudinal direction is different from a rigidity in the optical axis direction orthogonal to the longitudinal direction and the width direction, and the rigidity in the width direction is lower than the rigidity in the optical axis direction. More specifically, a cross section of the elastic portion 805 when seen from the longitudinal direction is a rectangle (rectangle having a short side in the width direction and a long side in the optical axis direction), and the elastic portion 805 has a thickness t1 in the width direction (first direction) being thinner than a thickness t2 in the optical axis direction (second direction). With this configuration, the elastic portion 805 has the rigidity in the width direction being lower than the rigidity in the optical axis direction.

The cleaning rod 801 is provided with the protruding portion 806 protruding to the one side in the width direction. The protruding portion 806 protrudes outward in the width direction with respect to a second guiding member 808 (see FIG. 13B) and is provided at a position where abutment on a first guiding member 809 (see FIG. 14B) is possible. The protruding portion 806 is provided to be movable between the position protruding outward in the width direction with respect to the second guiding member 808 and a position retracted inward in the width direction of the second guiding member 808 from the protruding position. The protruding portion 806 is guided by the first guiding member 809 at the protruding position. Note that the second guiding member 808 and the first guiding member 809 will be described later.

The protruding portion 806 is provided in the elastic portion 805, and moves in the width direction when the elastic portion 805 is elastically deformed in the width direction. In other words, the protruding portion 806 is provided to be movable in the width direction.

The protruding portion 806 is provided in the vicinity (immediately behind in the longitudinal direction) of the cleaning portion 803, and here, the protruding portion 806 is provided immediately behind in the longitudinal direction of the cleaning portion 803.

Further, the cleaning rod 801 includes the guide member 807 that restricts a position of the elastic portion 805 in the optical axis direction (second direction). The guide member 807 restricts deformation of the elastic portion 805, caused by an unexpected external force in the optical axis direction, within a predetermined range. A material of the guide member 807 is a metal material, for example, sheet metal made of a metal material.

(Guide Configuration of Cleaning Rod)

Figure 12A:
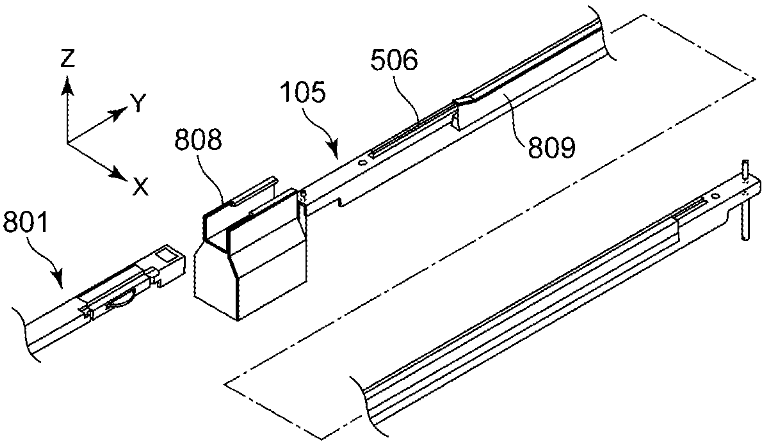
FIGS. 12A to 12C are views illustrating a guide configuration of the cleaning rod according to the first embodiment.
Figure 12B:
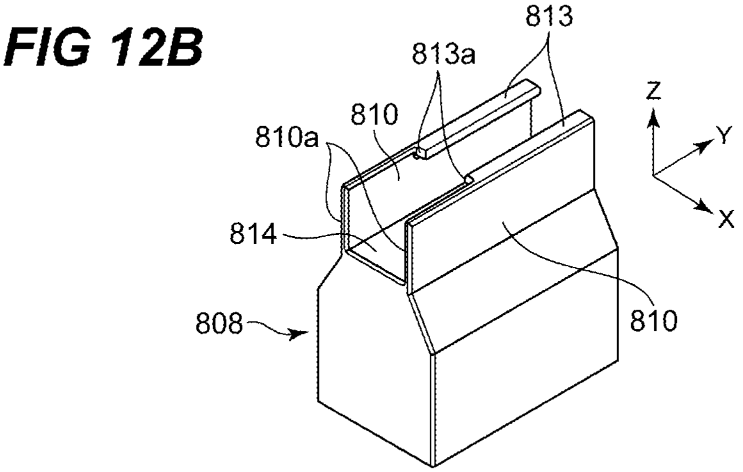
Figure 12C:
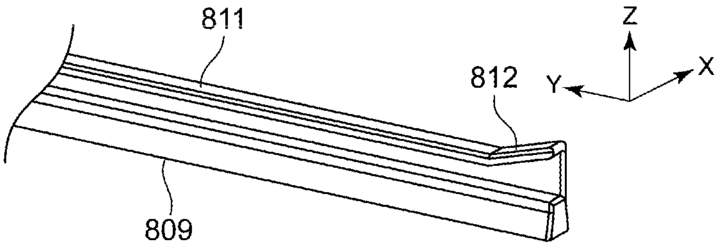

Next, a guide configuration of the cleaning rod 801 will be described with reference to FIGS. 12A to 12C. FIG. 12A is a perspective view illustrating the guide configuration of the cleaning rod 801. FIG. 12B is a perspective view of the second guiding member. FIG. 12C is a perspective view of the first guiding member.

The image forming apparatus 1 includes the frame 800 (see FIG. 2) as a housing. As illustrated in FIG. 12A, the frame 800 is provided with the second guiding member 808 and the first guiding member 809. The second guiding member 808 and the first guiding member 809 are disposed apart from each other on the front side and the back side in the front-rear direction of the image forming apparatus 1, and the second guiding member 808 is disposed on the front side and the first guiding member 809 is disposed on the back side.

The second guiding member 808 is provided on an extension line of the longitudinal direction of the lens array 506. The second guiding member 808 is provided on the front side in the longitudinal direction of the lens array 506 separately from the optical print head 105. The second guiding member 808 guides the cleaning rod 801 between the photosensitive drum 103 and the optical print head 105.

As illustrated in FIG. 12B, the second guiding member 808 includes a placement portion 814 on which the cleaning rod 801 is placed, a first restricting portion 810, and a second restricting portion 813.

The second guiding member 808 includes the first restricting portion 810 that restricts a position of the cleaning rod 801 in the width direction orthogonal to the longitudinal direction. The first restricting portions 810 are provided to face each other on both sides in the width direction. The position of the cleaning rod 801 in the width direction is restricted between the first restricting portions 810 and 810 provided to face each other on both the sides in the width direction.

The second guiding member 808 includes the second restricting portion 813 that restricts a position of the cleaning rod 801 in the optical axis direction. The second restricting portion 813 is provided so as to face the placement portion 814 in the optical axis direction.

The second restricting portion 813 is provided on the back side of the first restricting portion 810 in the longitudinal direction, and an end 813*a* of the second restricting portion 813 on the front side in the longitudinal direction is located on the back side in the longitudinal direction of an end 810*a* of the first restricting portion 810 on the front side in the longitudinal direction. The second restricting portion 813 restricts the position in the optical axis direction of the cleaning rod 801 restricted in the width direction by the first restricting portion 810. As a result, the operability of inserting the cleaning rod 801 into the second guiding member 808 is improved.

Figure 13A:
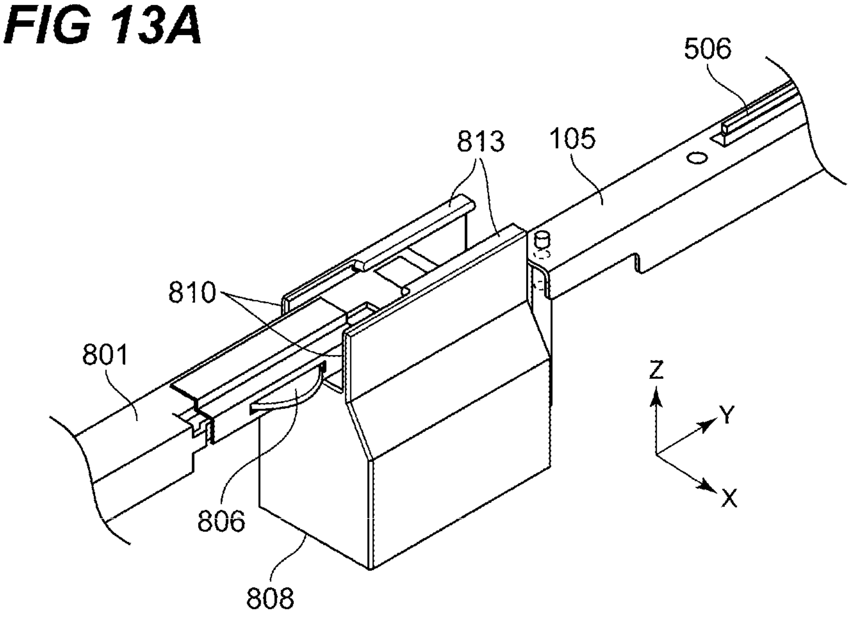
FIGS. 13A and 13B are views illustrating a configuration of a second guiding member according to the first embodiment.
Figure 13B:
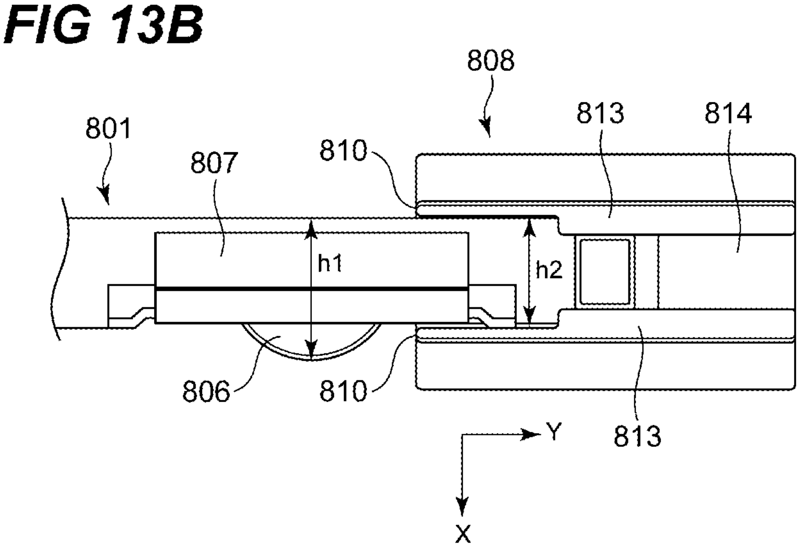

A width h1 of the cleaning rod 801 including the protruding portion 806 in the width direction is wider than a width h2 of the second guiding member 808 in the width direction on the inner side of the first restricting portions 810 and 810 (see FIG. 13B). As described above, the protruding portion 806 is provided in the elastic portion 805 and is movable (elastically deformable) in the width direction. When entering between the first restricting portions 810 and 810 of the second guiding member 808, the protruding portion 806 moves to a position retracted inward in the width direction of the second guiding member 808 from a position protruding more than the width h2 of the second guiding member 808 due to the elastic deformation of the elastic portion 805. Then, when passing through the second guiding member 808, the protruding portion 806 moves from the retracted position to the protruding position, that is, returns to the position where the abutment on the first guiding member 809 is possible as the original position by a restoring force of the elastic portion 805.

Although not illustrated, the second guiding member 808 includes a stopper (not illustrated) configured to stop the inserted cleaning rod 801 at a predetermined position. As a result, when being inserted into the second guiding member 808, the cleaning rod 801 is stopped at the predetermined position by the stopper.

As described above, the first guiding member 809 is provided on the back side of the second guiding member 808 in the longitudinal direction. The first guiding member 809 is provided separately from the optical print head 105 on the outer side in the width direction (first direction) orthogonal to the longitudinal direction of the optical print head 105. The first guiding member 809 guides the cleaning rod 801 guided between the photosensitive drum 103 and the optical print head 105 along the longitudinal direction of the optical print head 105.

As illustrated in FIG. 12C, the first guiding member 809 includes a first guide portion (inclined portion) 812 and a second guide portion (restricting portion) 811. The first guide portion 812 has an inclination to guide the cleaning rod 801 in a direction in which the cleaning portion 803 approaches the light emergent surface of the lens array 506 in the optical axis direction. The first guide portion 812 is provided at an end of the first guiding member 809 on the second guiding member 808 side.

When the protruding portion 806 of the cleaning rod 801 abuts, the first guide portion 812 guides the cleaning portion 803 in the direction of approaching the light emergent surface of the lens array 506, and causes the cleaning portion 803 to abut on the light emergent surface of the lens array 506.

The second guide portion 811 is provided on the back side of the first guide portion 812 in the longitudinal direction. The second guide portion 811 is provided in the longitudinal direction along the lens array 506. When the protruding portion 806 of the cleaning rod 801 abuts, the second guide portion 811 restricts the position in the optical axis direction of the cleaning portion 803 abutting on the light emergent surface of the lens array 506 over the longitudinal direction of the lens array 506.

The first guide portion 812 and the second guide portion 811 are provided on the outer side of the optical print head 105 in the width direction, and do not hinder the movement of the optical print head 105 moving between the exposure position and the retracted position along the optical axis direction. In addition, the protruding portion 806 of the cleaning rod 801 protrudes outward in the width direction with respect to the optical print head 105 and is provided at the position where abutment on the first guiding member 809 is possible (see FIG. 14B). The first guide portion 812 and the second guide portion 811 abut on the protruding portion 806 protruding outward in the width direction with respect to the optical print head 105, thereby restricting the position of the cleaning portion 803 in the optical axis direction as described above.

(Cleaning Operation)

Next, an operation during cleaning of the lens array 506 using the cleaning rod 801 will be described.

As described above, the optical print head 105 is supported to be movable between the exposure position of exposing the photosensitive drum 103 and the retracted position of being retracted in the direction farther away from the photosensitive drum 103 than the exposure position. The optical print head 105 is moved between the exposure position and the retracted position along the optical axis direction by the moving mechanism (not illustrated).

The cleaning of the light emergent surface of the lens array 506 using the cleaning rod 801 is performed in a state where the optical print head 105 is moved to the retracted position farther away from the photosensitive drum 103 than the exposure position by the moving mechanism (not illustrated). That is, the retracted position referred to here means a cleaning position for cleaning the light emergent surface of the lens array 506. The operator grips and operates the grip portion 802 provided on the rear end side of the cleaning rod 801 to clean the light emergent surface of the lens array 506.

As illustrated in FIG. 11C, the cleaning portion 803 is provided on the distal end side of the cleaning rod 801 (the other end side in the rotational axis direction of the photosensitive drum 103) and on the lower side. The cleaning portion 803 is, for example, an elastically deformable member made of rubber such as sponge or elastomer, and scrapes off and cleans dirt such as a toner dropped on the light emergent surface of the lens array 506. In addition, the cleaning portion 803 is not limited to the elastically deformable member, and may be a nonwoven fabric made of fiber such as cotton, nylon, or polyester and wipe off and clean dirt such as a toner dropped on the light emergent surface of the lens array 506.

FIG. 13A illustrates a state in which the cleaning rod 801 is inserted into the second guiding member 808 provided in the image forming apparatus 1. FIG. 13B is a view (view seen from above the body) for describing a function of the second guiding member 808. The second guiding member 808 is provided on an apparatus body front side of the optical print head 105. As illustrated in FIG. 13B, the second guiding member 808 has the first restricting portions 810 and 810 on both the sides in the first direction. When the cleaning rod 801 is inserted between the first restricting portions 810 and 810 of the second guiding member 808 by the operator, the protruding portion 806 protruding from the cleaning rod 801 in the first direction abuts on one of the first restricting portions 810. At this time, since the width of the cleaning rod 801 including the protruding portion 806 is larger than the width between the first restricting portions 810 and 810 in the first direction, when the cleaning rod is further inserted, the protruding portion 806 is retracted by the elastic deformation of the elastic portion 805 in the first direction, and the cleaning rod 801 proceeds while abutting on the first restricting portion 810. As a result, the operator can insert the cleaning rod 801 while restricting the position of the cleaning rod 801 in the first direction. When the restriction (abutment) by the one first restricting portion 810 is released after the distal end side of the cleaning rod 801 passes through the second guiding member 808, the protruding portion 806 returns to the position before the elastic deformation by the restoring force of the elastic portion 805 in the first direction. That is, the protruding portion 806 returns to a position where the abutment on the first guide portion 812 and the second guide portion 811 of the first guiding member 809 is possible.

Figure 14A:
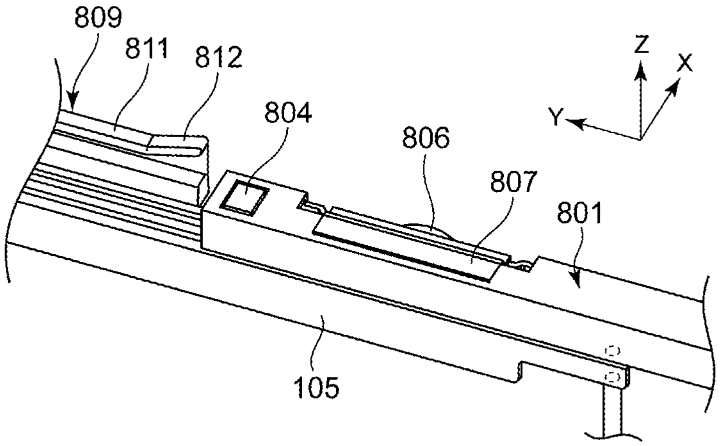
FIGS. 14A and 14B are views illustrating a configuration of a first guiding member according to the first embodiment.
Figure 14B:
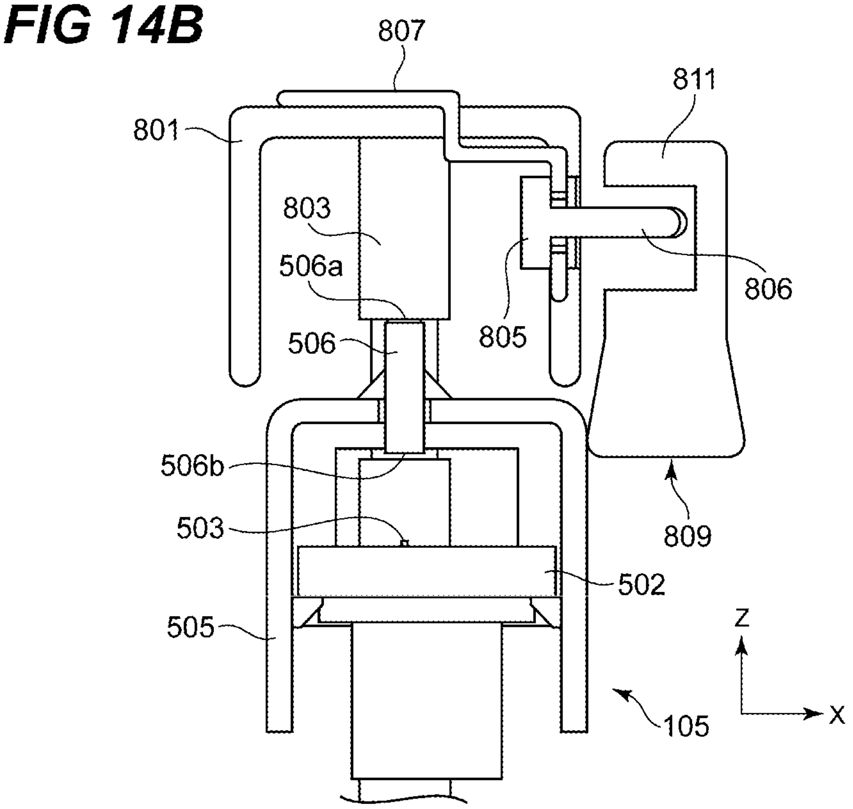

FIG. 14A illustrates a state immediately before the cleaning rod 801 is inserted into the first guiding member 809 provided in the image forming apparatus 1. FIG. 14B is a cross-sectional view for describing a function of the first guiding member 809 as seen from the apparatus body front side. The first guiding member 809 is provided on the back side of the second guiding member 808. In addition, the first guiding member 809 is disposed in the longitudinal direction along the optical print head 105. The first guide portion 812 is provided at an end of the first guiding member 809 on the second guiding member 808 side. As illustrated in FIG. 14A, the first guide portion 812 is inclined downward from the front side which is one end side in the longitudinal direction toward the back side which is the other end side. As a result, when the cleaning rod 801 is inserted into the first guiding member 809 by the operator, the protruding portion 806 is guided to proceed downward by the first guide portion 812. Therefore, the operator can more easily insert the cleaning rod 801 into the first guiding member 809 without causing the protruding portion 806 to deviate above the first guiding member 809. In other words, the cleaning rod 801 can be stably guided with respect to the optical print head 105, and the workability during cleaning is improved. In addition, the cleaning portion 803 reliably abuts on the light emergent surface of the lens array 506, thereby forming a state where cleaning can be started.

As illustrated in FIG. 14B, the first guiding member 809 has a C-shaped cross section, and includes the second guide portion 811 in an upper part in the second direction. When the cleaning portion 803 cleans the light emergent surface of the lens array 506, a repulsive force from the lens array 506 acts on the cleaning portion 803, and the distal end side of the cleaning rod 801 attempts to lift upward in the second direction. At this time, the position of the cleaning rod 801 in the second direction is restricted by the second restricting portion 813 (see FIG. 12B) provided on the second guiding member 808. However, as the cleaning rod 801 is inserted into the back side, the cleaning portion 803 moves away from the second restricting portion 813, so that the restriction is insufficient only with the second restricting portion 813. Therefore, the protruding portion 806 provided in the vicinity of the cleaning portion 803 of the cleaning rod 801 abuts on the second guide portion 811 provided in the longitudinal direction along the optical print head 105. Due to the abutment between the protruding portion 806 of the cleaning rod 801 and the second guide portion 811 of the first guiding member 809, the repulsive force from the lens array 506 with respect to the cleaning portion 803 can be received, the position of the distal end side of the cleaning rod 801 in the second direction is restricted, and the uplift on the back side is prevented. As a result, the cleaning rod 801 can be inserted up to the back side without moving the cleaning portion 803 of the cleaning rod 801 away from the light emergent surface of the lens array 506, and the light emergent surface of the lens array 506 can be reliably cleaned over the entire area in the longitudinal direction.

According to the present embodiment, the cleaning rod 801 (cleaning portion 803) can be stably guided with respect to the optical print head 105 by the first guide portion (inclined portion) 812 of the first guiding member 809. The light emergent surface of the lens array 506 of the optical print head 105 can be reliably cleaned due to the second guide portion (restricting portion) 811 of the first guiding member 809.

In addition, since the positions of the cleaning rod 801 during insertion and during cleaning are restricted by the second guiding member 808 and the first guiding member 809, the cleaning portion 803 can be reliably cleaned without coming off from a lens surface even when the operator applies an unexpected force.

In addition, the space is saved by minimizing an opening of the first restricting portion 810, and the second guiding member 808 can be disposed for each color even when a distance between the photosensitive drums 103 of the respective colors is narrowed. In addition, it is possible to restrict deflection in the first direction when the operator inserts the cleaning rod 801.

[Detailed Description of Cleaning Portion]

Figure 15:
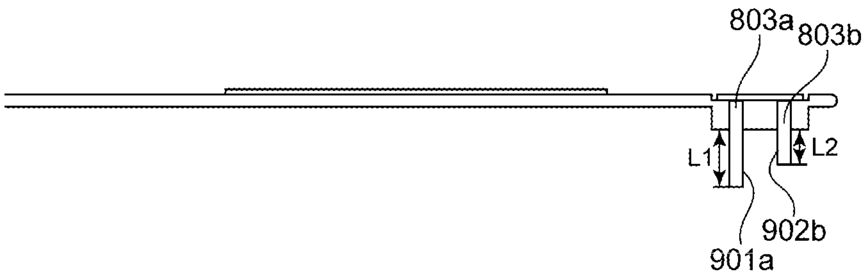
FIG. 15 is a view illustrating a cleaning portion of the cleaning rod according to the first embodiment.

FIG. 15 is a cross-sectional view of the cleaning rod 801 in the left-right direction in the present embodiment.

In the present embodiment, as the cleaning portion 803 includes a cleaning member 803*a* (first cleaning portion) and a cleaning member 803*b* (second cleaning portion). Each of the cleaning member 803*a* and the cleaning member 803*b* is provided so as to protrude in a direction away from the cleaning rod 801 in a light emitting direction of the lens array 506 which is the optical axis direction. Each of the cleaning member 803*a* and the cleaning member 803*b* is a member having flexibility, and made of, for example, a material such as urethane rubber. The cleaning members 803*a* and 803*b* are provided at different positions in the longitudinal direction of the cleaning rod 801, and are provided so as to have different protrusion amounts in the optical axis direction. In the present embodiment, the cleaning member 803*b* is provided at a position closer to an end than the cleaning member 803*a* in the longitudinal direction, and the cleaning member 803*a* has a longer protrusion amount in the optical axis direction than the cleaning member 803*b*. Although details will be described later, each of the cleaning member 803*a* and the cleaning member 803*b* has a rectangular cross-sectional shape, and is deformed in the longitudinal direction when coming into contact with the light emergent surface of the lens array 506. In the present embodiment, a protrusion amount of the cleaning portion 803 indicates a portion where the cleaning portion 803 protrudes from the cleaning rod 801 in the optical axis direction and the cleaning portion 803 is exposed from the cleaning rod 801, and a portion where the cleaning portion 803 is deformable in the longitudinal direction. In the present embodiment, the cleaning portion 803 protruding from the cleaning rod 801 is defined as a protruding portion. FIG. 15 illustrates a protrusion amount L1 of the cleaning member 803*a* and a protrusion amount L2 of the cleaning member 803*b*. The cleaning member 803*a* and the cleaning member 803*b* have a side surface 901*a* and a side surface 901*b*, respectively, which are side surfaces in the longitudinal direction.

Figure 16A:
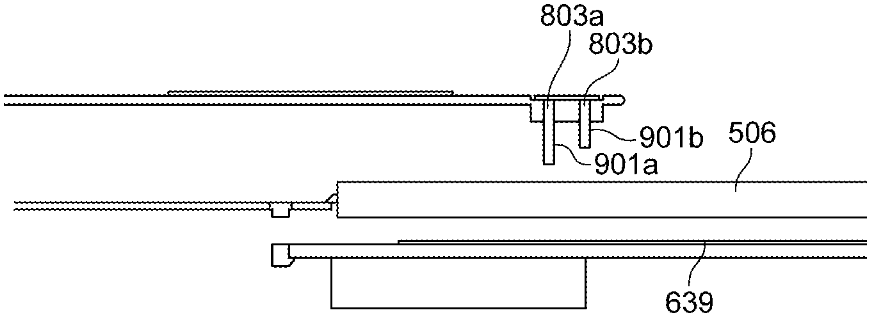
FIGS. 16A to 16C are views of the cleaning portion as seen from a side surface in the left-right direction according to the first embodiment.
Figure 16B:
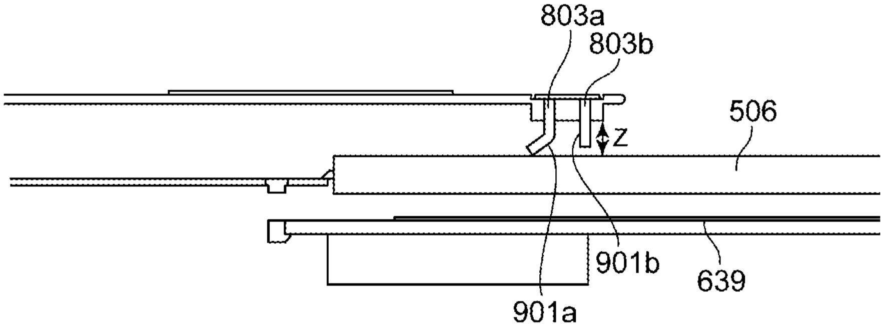
Figure 16C:
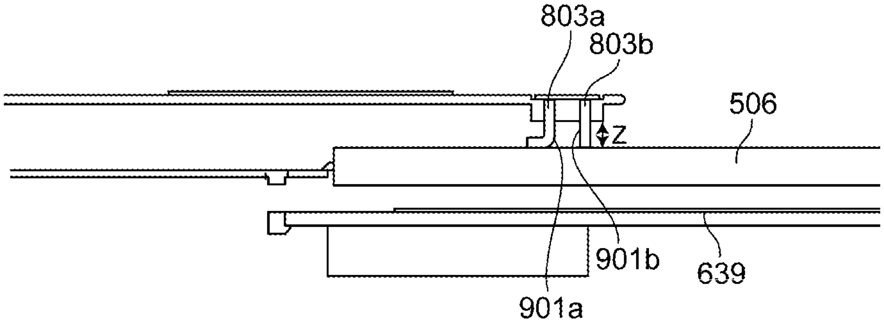

FIGS. 16A to 16C are views of the cleaning rod 801 facing the lens array 506 as seen from a side surface in the left-right direction. As illustrated in FIGS. 16A to 16C, a distance from a portion of the protruding portion of the cleaning portion 803 closest to the cleaning rod 801 to the lens array 506 in the optical axis direction is indicated by an arrow Z. FIG. 16A illustrates a state in which the cleaning rod 801 is in contact with the second guiding member 808. In FIG. 16A, the protrusion amount of the cleaning member 803*a* is equal to the distance from the cleaning rod 801 to the lens array 506. Therefore, the cleaning member 803*a* is not deformed, and the cleaning member 803*b* is also not deformed.

In FIG. 16B, the distance between the cleaning rod 801 and the lens array 506 in the optical axis direction is shorter than that in FIG. 16A. In FIG. 16B, the cleaning member 803*a* is in contact with the lens array 506 in a state of being deformed in the longitudinal direction. Although the cleaning member 803*a* is in contact with the lens array 506 in FIG. 16B, the side surface 901*a* of the cleaning member 803*a* is not in contact with the lens array. That is, an edge of the cleaning member 803*a* comes into contact with the lens array 506 in FIG. 16B.

In FIG. 16C, the distance between the cleaning rod 801 and the lens array 506 in the optical axis direction is shorter than that in FIG. 16B. In FIG. 16C, the cleaning member 803*a* is further deformed as compared with FIG. 16B, and is in contact with the surface of the lens array 506 at the side surface 901*a*. As compared with a case where the edge of the cleaning member comes into contact with the surface of the lens array 506 as illustrated in FIG. 16B, a contact area with the surface of the lens array 506 increases in a case where the side surface 901*a* comes into contact with the surface of the lens array 506 as illustrated in FIG. 16C. Therefore, when the cleaning member 803*a* comes into contact with the surface of the lens array 506 as illustrated in FIG. 16C, a contact pressure from the cleaning member 803*a* to the surface of the lens array 506 decreases as compared with FIG. 16B, and there is a possibility that the foreign matter adhering to the surface of the lens array 506 cannot be sufficiently removed. However, an edge of the cleaning member 803*b* comes into contact with the surface of the lens array 506 when the cleaning member 803*a* comes into contact with the surface of the lens array 506 at the side surface 901*a* as illustrated in FIG. 16C. Therefore, the cleaning member 803*b* can remove the foreign matter adhering to the surface of the lens array 506 even when the cleaning member 803*a* cannot sufficiently remove the foreign matter adhering to the surface of the lens array 506.

Since the plurality of cleaning members having different protrusion amounts is provided in the present embodiment as described above, the foreign matter adhering to the surface of the lens array 506 can be effectively removed even when the distance between the cleaning rod 801 and the lens array 506 in the optical axis direction changes.

Although the two cleaning members having different protrusion amounts are provided on the cleaning rod in the present embodiment, three or more cleaning members may be provided not limited thereto. In addition, cleaning members having the same protrusion amount may be included when three or more cleaning members are provided although the two cleaning members having different protrusion amounts are provided in the present embodiment.

Although the two cleaning members having the same cross-sectional shape are used in the present embodiment, but a plurality of cleaning members respectively having different cross-sectional shapes may be used.

Second Embodiment

The image forming apparatus 1 including the cleaning rod 801 according to a second embodiment will be described. The same parts as those in the first embodiment will be denoted by the same numerals, and the description thereof will be omitted. A configuration of the image forming apparatus according to the present embodiment is the same as that in the above-described first embodiment except for configurations of the cleaning rod 801 and the first guiding member 809, and thus, the description thereof is omitted here. In the present embodiment, a configuration of the cleaning rod, a guide configuration of the cleaning rod, and a cleaning operation, which are different from those in the first embodiment, will be described.

(Configuration of Cleaning Rod)

Next, the configuration of the cleaning rod 801 according to the second embodiment will be described with reference to FIGS. 17A to 17C.

Figure 17A:
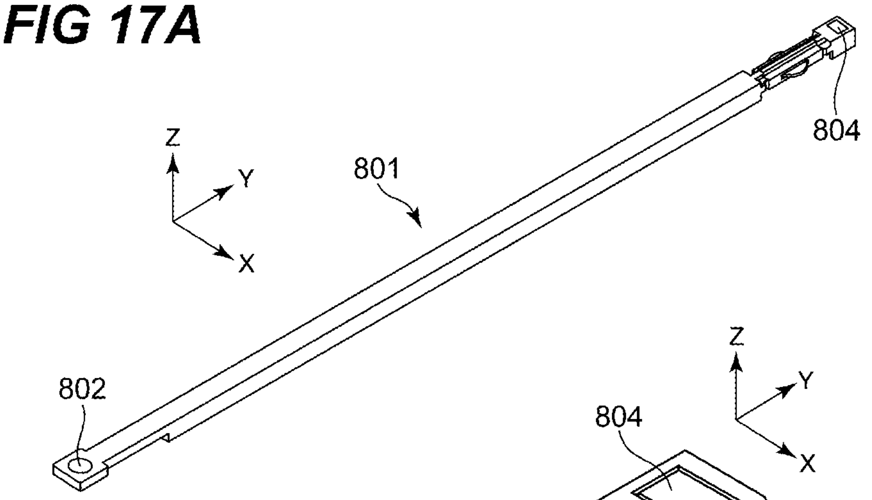
FIGS. 17A to 17C are views illustrating a configuration of a cleaning rod according to a second embodiment.
Figure 17B:
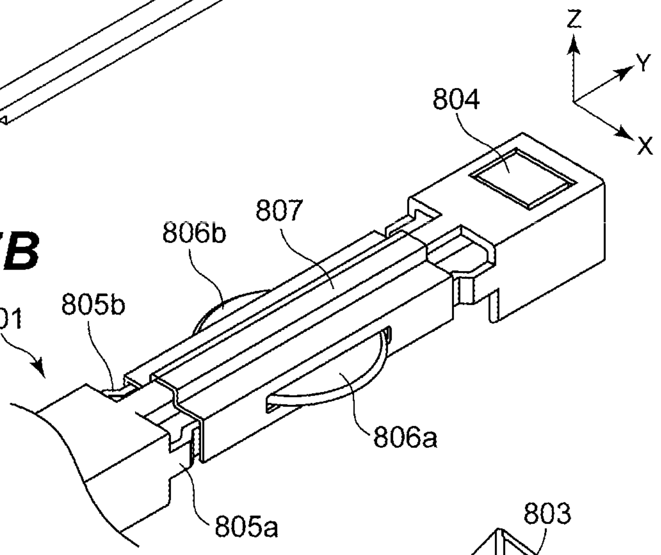
Figure 17C:
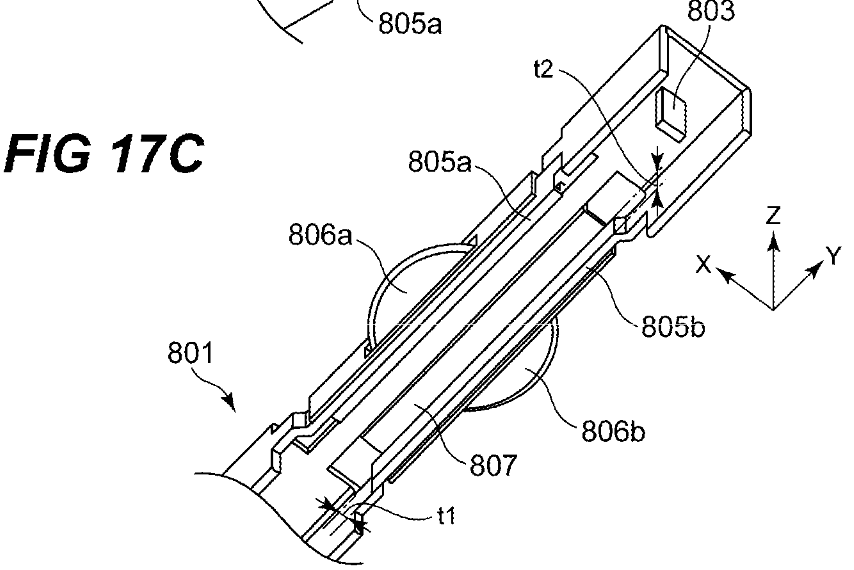

FIG. 17A is a schematic perspective view of the cleaning rod 801 that cleans a surface of the lens array 506 of the optical print head 105. FIG. 17B is a view illustrating a distal end side of the cleaning rod 801 in the longitudinal direction. FIG. 17C is a view of the distal end side of the cleaning rod 801 as seen from below. Here, the longitudinal direction Y, the width direction (first direction) X, and the optical axis direction (second direction) Z of the optical print head 105 defined in the above-described embodiment are illustrated in FIGS. 17A to 19.

The cleaning rod 801 according to the present embodiment includes the cleaning portion 803, the grip portion 802, protruding portions 806*a* and 806*b*, elastic portions 805*a* and 805*b*, and the guide member 807. The cleaning portion 803 and the grip portion 802 are similar to those of the above-described embodiment, and thus, the description thereof is omitted here.

The cleaning rod 801 according to the present embodiment includes the elastic portions 805*a* and 805*b* on both sides in the width direction. The cleaning rod 801 is provided with the elastic portion 805*a* on one side in the width direction and the elastic portion 805*b* on the other side. In each of the elastic portions 805*a* and 805*b*, a rigidity in the width direction orthogonal to the longitudinal direction is different from a rigidity in the optical axis direction orthogonal to the longitudinal direction and the width direction, and the rigidity in the width direction is lower than the rigidity in the optical axis direction. More specifically, a cross section of each of the elastic portions 805*a* and 805*b* when seen from the longitudinal direction is a rectangle (rectangle having a short side in the width direction and a long side in the optical axis direction), and each of the elastic portions 805*a* and 805*b* has a thickness t1 in the width direction (first direction) being thinner than a thickness t2 in the optical axis direction (second direction). With this configuration, the rigidity of each of the elastic portions 805*a* and 805*b* in the width direction is lower than the rigidity in the optical axis direction.

The cleaning rod 801 according to the present embodiment includes the protruding portions 806*a* and 806*b* on both the sides in the width direction. The cleaning rod 801 is provided with the protruding portion 806*a* protruding to one side in the width direction and the protruding portion 806*b* protruding to the other side. The protruding portions 806*a* and 806*b* protrude outward in the width direction from the second guiding member 808 and are provided at positions where the protruding portions can abut on first guiding members 809*a* and 809*b*, respectively. Each of the protruding portions 806*a* and 806*b* is provided to be movable between the position protruding outward in the width direction with respect to the second guiding member 808 and a position retracted inward in the width direction of the second guiding member 808 from the protruding position. The protruding portions 806*a* and 806*b* are guided by the first guiding members 809*a* and 809*b* at the protruding positions. Since the second guiding member 808 is similar to that of the above-described embodiment, the description thereof is omitted here. The first guiding members 809*a* and 809*b* will be described later.

The protruding portions 806*a* and 806*b* are provided in the elastic portions 805*a* and 805*b*, respectively, and move in the width direction as the elastic portions 805*a* and 805*b* are elastically deformed in the width direction. In other words, the protruding portions 806*a* and 806*b* are provided to be movable in the width direction.

Further, the cleaning rod 801 includes the guide member 807 that restricts a position of each of the elastic portions 805*a* and 805*b* in the optical axis direction (second direction). The guide member 807 restricts deformation of each of the elastic portions 805*a* and 805*b*, caused by an unexpected external force in the optical axis direction, within a predetermined range. A material of the guide member 807 is a metal material, for example, sheet metal made of a metal material.

(Guide Configuration of Cleaning Rod)

Figure 18A:
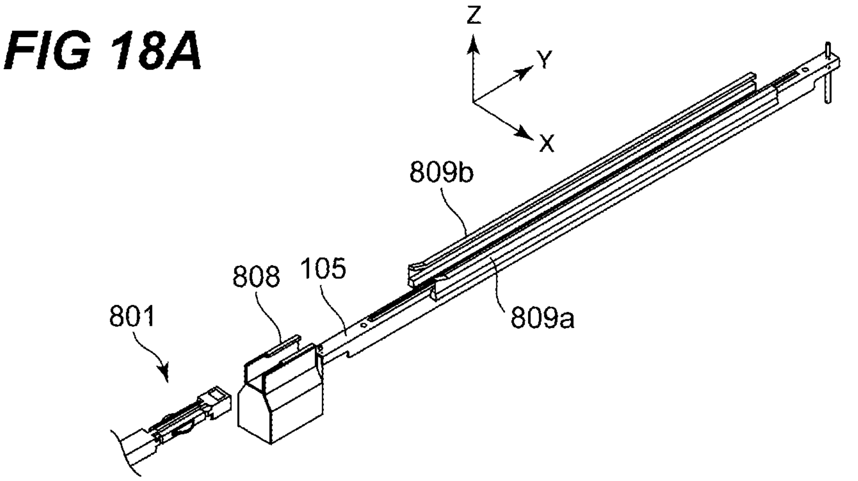
FIGS. 18A to 18C are views illustrating a guide configuration of the cleaning rod according to the second embodiment.
Figure 18B:
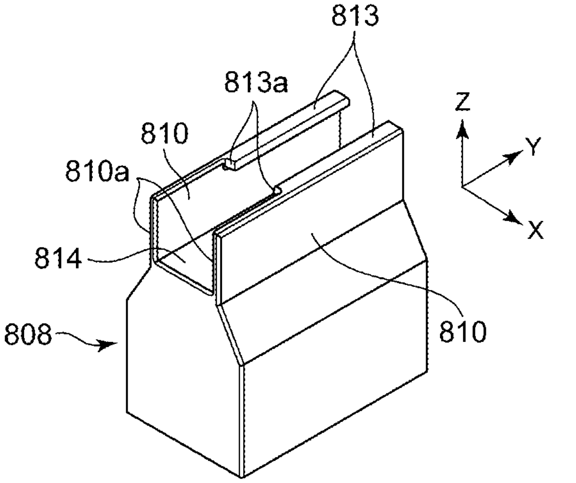
Figure 18C:
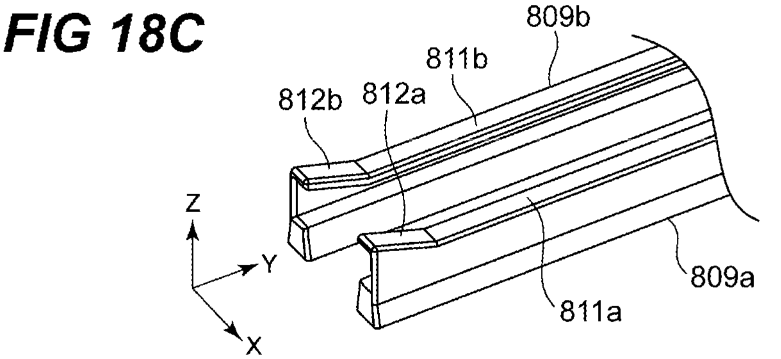

Next, the guide configuration of the cleaning rod 801 will be described with reference to FIGS. 18A to 18C. FIG. 18A is a perspective view illustrating the guide configuration of the cleaning rod 801. FIG. 18B is a perspective view of the second guiding member. FIG. 18C is a perspective view of the first guiding members.

As illustrated in FIG. 18A, the frame 800 (see FIG. 2) as a housing included in the image forming apparatus 1 is provided with the second guiding member 808 and first guiding members 809*a* and 809*b*. The second guiding member 808 and the first guiding members 809*a* and 809*b* are disposed apart from each other on the front side and the back side in the front-rear direction of the image forming apparatus 1, and the second guiding member 808 is disposed on the front side and the first guiding members 809*a* and 809*b* are disposed on the back side.

Here, the second guiding member 808 illustrated in FIG. 18B is similar to that of the above-described embodiment, and thus, the description thereof is omitted here.

A width of the cleaning rod 801 including the protruding portions 806*a* and 806*b* in the width direction is wider than a width of the second guiding member 808 in the width direction on the inner side of the first restricting portions 810 and 810. As described above, the protruding portions 806*a* and 806*b* are provided in the elastic portions 805*a* and 805*b*, respectively, and are movable (elastically deformable) in the width direction. When entering between the first restricting portions 810 and 810 of the second guiding member 808, the protruding portions 806*a* and 806*b* move to positions retracted inward in the width direction of the second guiding member 808 from positions protruding more than the width of the second guiding member 808 due to elastic deformation of the elastic portions 805*a* and 805*b*. Then, when passing through the second guiding member 808, the protruding portions 806*a* and 806*b* move from the retracted positions to the protruding positions by restoring forces of the elastic portions 805*a* and 805*b*, that is, return to positions where the protruding portions can abut on the first guiding members 809*a* and 809*b*, respectively, as the original positions.

The first guiding members 809*a* and 809*b* according to the present embodiment are provided on both sides in the width direction, respectively. The first guiding member 809*a* on one side in the width direction has a first guide portion 812*a* and a second guide portion 811*a*, and the first guiding member 809*b* on the other side has a first guide portion 812*b* and a second guide portion 811*b*. The first guiding members 809*a* and 809*b* are provided to face each other in the width direction, and are provided on both the sides with the optical print head 105 interposed therebetween.

As described above, the first guiding members 809*a* and 809*b* are provided on the back side of the second guiding member 808 in the longitudinal direction. The first guiding members 809*a* and 809*b* are provided separately from the optical print head 105 on the outer side in the width direction (first direction) orthogonal to the longitudinal direction of the optical print head 105. The first guiding members 809*a* and 809*b* guide the cleaning rod 801 guided between the photosensitive drum 103 and the optical print head 105 along the longitudinal direction of the optical print head 105.

As illustrated in FIG. 18C, the first guiding members 809*a* and 809*b* include the first guide portions (inclined portions) 812*a* and 812*b* and second guide portions (restricting portions) 811*a* and 812*b*, respectively. That is, the one first guiding member 809*a* includes the first guide portion (inclined portion) 812*a* and the second guide portion (restricting portion) 811*a*. The other first guiding member 809*b* has the first guide portion (inclined portion) 812*b* and the second guide portion (restricting portion) 812*b*. Since the first guide portions (inclined portions) 812*a* and 812*b* and the second guide portions (restricting portions) 811*a* and 812*b* are similar to those in the above-described embodiment, the description thereof is omitted here.

(Cleaning Operation)

Next, an operation during cleaning of the lens array 506 using the cleaning rod 801 will be described.

The cleaning of the light emergent surface of the lens array 506 using the cleaning rod 801 is performed in a state where the optical print head 105 is moved to the retracted position farther away from the photosensitive drum 103 than the exposure position by the moving mechanism (not illustrated). That is, the retracted position referred to here means a cleaning position for cleaning the light emergent surface of the lens array 506. The operator grips and operates the grip portion 802 provided on the rear end side of the cleaning rod 801 to clean the light emergent surface of the lens array 506.

Since the cleaning portion 803 is similar to that of the above-described embodiment, the description thereof is omitted here.

The second guiding member 808 is provided on an apparatus body front side of the optical print head 105. The second guiding member 808 has the first restricting portions 810 and 810 on both the sides in the first direction. When the cleaning rod 801 is inserted between the first restricting portions 810 and 810 of the second guiding member 808 by the operator, the protruding portions 806*a* and 806*b* protruding from the cleaning rod 801 in the first direction abut on the first restricting portions 810 and 810, respectively. At this time, in the first direction, the width of the cleaning rod 801 including the protruding portions 806*a* and 806*b* is wider than the width between the first restricting portions 810 and 810. Therefore, when the cleaning rod 801 is further inserted, the protruding portions 806*a* and 806*b* are retracted by elastic deformation of the elastic portions 805*a* and 805*b* in the first direction, and proceed while abutting on the first restricting portions 810 and 810. As a result, the operator can insert the cleaning rod 801 while restricting the position of the cleaning rod 801 in the first direction. When the restriction (abutment) by both the first restricting portions 810 and 810 is released after the distal end side of the cleaning rod 801 passes through the second guiding member 808, the protruding portions 806*a* and 806*b* return to the positions before the elastic deformation by the restoring forces of the elastic portions 805*a* and 805*b* in the first direction. That is, the protruding portions 806*a* and 806*b* returns to a position where the abutment on the first guide portions 812_a_ and 812_b_ and the second guide portions 811_a_ and 811_b_ of the first guiding members 809_a_ and 809_b_ is possible.

Figure 19:
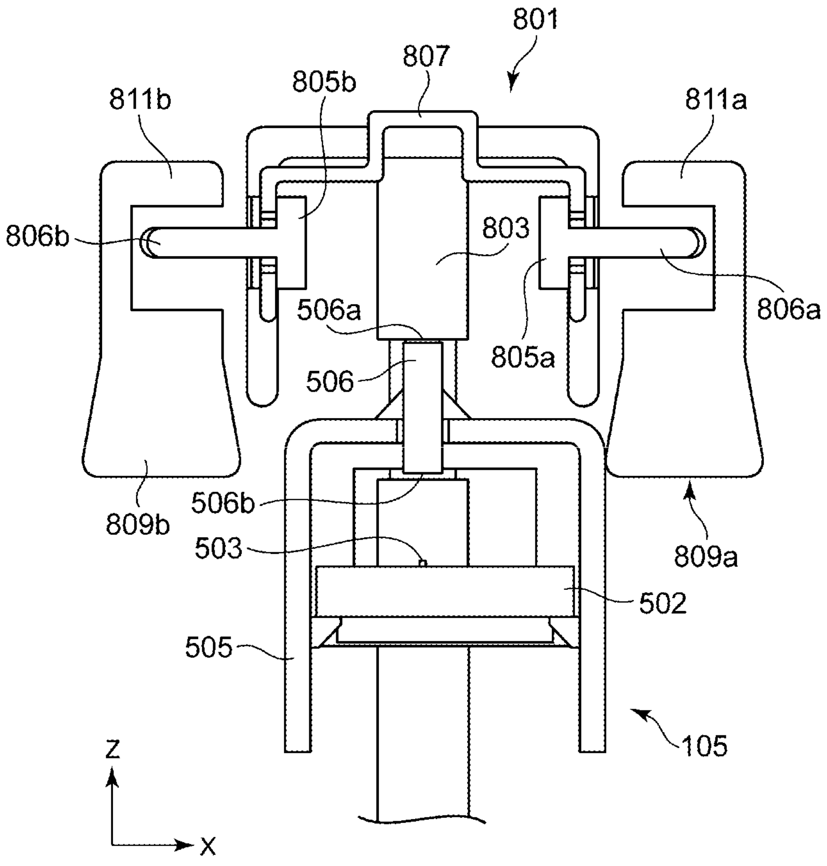
FIG. 19 is a view illustrating a configuration of a first guiding member according to the second embodiment.

FIG. 19 is a cross-sectional view for describing functions of the first guiding members 809_a_ and 809_b_ as seen from the apparatus body front side. The first guiding members 809_a_ and 809_b_ are provided on the back side of the second guiding member 808. In addition, the first guiding members 809_a_ and 809_b_ are disposed in the longitudinal direction along the optical print head 105. The first guide portions 812_a_ and 812_b_ are provided, respectively, at ends of the first guiding members 809_a_ and 809_b_ on the second guiding member 808 side. The first guide portions 812_a_ and 812_b_ are inclined downward from the front side which is one end side in the longitudinal direction toward the back side which is the other end side. As a result, when the cleaning rod 801 is inserted into the first guiding members 809_a_ and 809_b_ by the operator, the protruding portions 806_a_ and 806_b_ are guided to proceed downward by the first guide portions 812_a_ and 812_b_. Therefore, the operator can more easily insert the cleaning rod 801 into the first guiding members 809_a_ and 809_b_ without causing the protruding portions 806_a_ and 806_b_ to deviate above the first guiding members 809_a_ and 809_b_. In other words, the cleaning rod 801 can be stably guided with respect to the optical print head 105, and the workability during cleaning is improved. In addition, the cleaning portion 803 reliably abuts on the light emergent surface of the lens array 506, thereby forming a state where cleaning can be started.

As illustrated in FIG. 19, the first guiding members 809_a_ and 809_b_ have C-shaped cross sections, and have the second guide portions 811_a_ and 811_b_, respectively, in upper parts in the second direction. When the cleaning portion 803 cleans the light emergent surface of the lens array 506, a repulsive force from the lens array 506 acts on the cleaning portion 803, and the distal end side of the cleaning rod 801 attempts to lift upward in the second direction. At this time, the position of the cleaning rod 801 in the second direction is restricted by the second restricting portion 813 (see FIG. 18B) provided on the second guiding member 808. However, as the cleaning rod 801 is inserted into the back side, the cleaning portion 803 moves away from the second restricting portion 813, so that the restriction is insufficient only with the second restricting portion 813. Therefore, the protruding portions 806_a_ and 806_b_ provided in the vicinity of the cleaning portion 803 of the cleaning rod 801 abut on the second guide portions 811_a_ and 811_b_, respectively, provided in the longitudinal direction along the optical print head 105. Due to the abutment between the protruding portions 806_a_ and 806_b_ of the cleaning rod 801 and the second guide portions 811_a_ and 811_b_ of the first guiding members 809_a_ and 809_b_, the repulsive force from the lens array 506 with respect to the cleaning portion 803 can be received, the position of the distal end side of the cleaning rod 801 in the second direction is restricted, and the uplift on the back side is prevented. As a result, the cleaning rod 801 can be inserted up to the back side without moving the cleaning portion 803 of the cleaning rod 801 away from the light emergent surface of the lens array 506, and the light emergent surface of the lens array 506 can be reliably cleaned over the entire area in the longitudinal direction.

According to the present embodiment, the cleaning rod 801 (cleaning portion 803) can be stably guided with respect to the optical print head 105 by the first guide portions 812_a_ and 812_b_ of the first guiding members 809_a_ and 809_b_ on both the sides in the width direction. The light emergent surface of the lens array 506 of the optical print head 105 can be reliably cleaned due to the second guide portions 811_a_ and 811_b_ of the first guiding members 809_a_ and 809_b_ on both the sides in the width direction.

In addition, an effect of restricting the position of the cleaning rod 801 by the second guiding member 808 and the first guiding members 809_a_ and 809_b_ on both the sides in the width direction is enhanced, and the cleaning portion 803 can be reliably cleaned without coming off from a lens surface even when the operator applies a larger force.

OTHER EMBODIMENTS

Although the four image forming portions are used in the above-described embodiments, the number of image forming portions to be used is not limited, and may be appropriately set as necessary.

Further, the printer has been exemplified as the image forming apparatus in the above-described embodiments, but the present invention is not limited thereto. For example, another image forming apparatus such as a copying machine or a facsimile machine, or another image forming apparatus such as a multi-function peripheral combining these functions may be used. In addition, the image forming apparatus in which the intermediate transfer member is used, toner images of the respective colors are transferred onto the intermediate transfer member in a sequentially superimposed manner, and the toner images carried on the intermediate transfer member are collectively transferred to the recording material has been exemplified, but the present invention is not limited thereto. An image forming apparatus may be configured to use a recording material carrying member to transfer toner images of respective colors onto a recording material carried on the recording material carrying member in a sequentially superimposed manner. Similar effects can be obtained by applying the present invention to these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064103, filed Apr. 11, 2023, No. 2023-079711, filed May 12, 2023, which is hereby incorporated by reference herein in its entirety.

What is claimed is:

1. An image forming apparatus comprising:

a rotating photosensitive member;

an optical print head including a plurality of light emitting portions provided along a rotational axis direction of the photosensitive member and configured to emit light to expose the photosensitive member, a substrate on which the plurality of light emitting portions is provided, a lens configured to condense the light emitted by the plurality of light emitting portions on the photosensitive member, and a holder configured to hold the substrate and the lens;

a cleaning rod configured to abut on the lens and clean the lens;

a first guiding member configured to guide the cleaning rod along the rotational axis direction and restrict movement of the cleaning rod in an optical axis direction orthogonal to both the rotational axis direction and a width direction of the substrate orthogonal to the rotational axis direction, the first guiding member being separate from the holder; and a second guiding member separate from the holder and configured to guide the cleaning rod between the photosensitive member and the optical print head.

2. The image forming apparatus according to claim 1, wherein the first guiding member includes a first guide portion configured to guide the cleaning portion in a direction of approaching the lens in the optical axis direction and cause the cleaning portion to abut on the lens.

3. The image forming apparatus according to claim 1, wherein the first guiding member includes a second guide portion provided on a back side of the first guide portion in an insertion direction in which the cleaning rod is inserted, provided along the lens in the rotational axis direction, and configured to restrict a position of the cleaning rod abutting on the lens in the optical axis direction over the rotational axis direction.

4. The image forming apparatus according to claim 1, wherein the second guiding member includes a first restricting portion configured to restrict a position of the cleaning rod in the width direction orthogonal to the rotational axis direction.

5. The image forming apparatus according to claim 4, wherein the second guiding member includes a second restricting portion configured to restrict a position of the cleaning rod in the optical axis direction.

6. The image forming apparatus according to claim 5, wherein the second restricting portion is provided on a back side of the first restricting portion in the rotational axis direction, and restricts a position of the cleaning rod, restricted in the width direction by the first restricting portion, in the optical axis direction.

7. The image forming apparatus according to claim 4, wherein the first restricting portions are provided to face each other on both sides in the width direction, and a position of the cleaning rod in the width direction is restricted between the first restricting portions provided to face each other on both the sides in the width direction.

8. The image forming apparatus according to claim 1, wherein the cleaning rod is provided to protrude outward in the width direction with respect to the second guiding member, is provided to be movable between a position protruding outward in the width direction with respect to the second guiding member and a position retracted inward in the width direction of the second guiding member from the protruding position, and has a protruding portion guided by the first guiding member at the protruding position.

9. The image forming apparatus according to claim 8, wherein a width of the cleaning rod including the protruding portion in the width direction is wider than a width of the second guiding member in the width direction, and the protruding portion is moved from the protruding position to the retracted position during abutment on the second guiding member, and is moved from the retracted position to the protruding position when the abutment on the second guiding member is released.

10. The image forming apparatus according to claim 8, wherein the cleaning rod includes an elastic portion in which a rigidity in the width direction is lower than a rigidity in the optical axis direction, and the protruding portion is provided in the elastic portion, and moves in the width direction when the elastic portion is elastically deformed in the width direction.

11. The image forming apparatus according to claim 10, wherein the cleaning rod includes a guide member that restricts a position of the elastic portion in the optical axis direction.

12. The image forming apparatus according to claim 11, wherein a material of the guide member is a metal material.

13. The image forming apparatus according to claim 8, wherein the cleaning rod includes the protruding portions on each of both sides in the width direction, and the first guiding member includes the first guide portion and the second guide portion on each of both the sides in the width direction.

14. The image forming apparatus according to claim 1, wherein the second guiding member is provided on a front side of the optical print head in the rotational axis direction on an extension line of the rotational axis direction of the lens.

15. The image forming apparatus according to claim 1, wherein the optical print head is provided to be movable between an exposure position of exposing the photosensitive member and a retracted position farther away from the photosensitive member than the exposure position, and the second guiding member guides the cleaning rod between the photosensitive member and the optical print head retracted to the retracted position.

* * * * *